United States Patent [19]

Record et al.

[11] Patent Number: 5,625,821

[45] Date of Patent: Apr. 29, 1997

[54] ASYNCHRONOUS OR SYNCHRONOUS OPERATION OF EVENT SIGNALLER BY EVENT MANAGEMENT SERVICES IN A COMPUTER SYSTEM

[75] Inventors: Stephen E. Record, Ridgefield, Conn.; Ann M. Shepherd, Endwell; Steven S. Shultz, Endicott, both of N.Y.

[73] Assignee: International Business Machines Corporation, Armonk, N.Y.

[21] Appl. No.: 744,064

[22] Filed: Aug. 12, 1991

[51] Int. Cl.$^6$ .................................................. G06F 9/46
[52] U.S. Cl. .................................................. 395/670
[58] Field of Search .................................. 395/650, 775, 395/670, 671, 672

[56] References Cited

U.S. PATENT DOCUMENTS

| | | | |
|---|---|---|---|
| 4,034,353 | 7/1977 | Denny et al. | 364/200 |
| 4,166,290 | 8/1979 | Furtman et al. | 364/200 |
| 4,333,144 | 6/1982 | Whiteside et al. | 364/200 |
| 4,367,525 | 1/1983 | Brown et al. | 364/200 |
| 4,387,427 | 6/1983 | Cox et al. | 364/200 |
| 4,395,758 | 7/1983 | Helenius et al. | 364/200 |
| 4,429,363 | 1/1984 | Duke et al. | 364/200 |
| 4,462,077 | 7/1984 | York | 364/300 |
| 4,503,499 | 3/1985 | Mason et al. | 364/200 |
| 4,514,846 | 4/1985 | Federico et al. | 371/16 |
| 4,595,980 | 6/1986 | Innes | 364/200 |
| 4,598,364 | 7/1986 | Gum et al. | 364/300 |
| 4,636,940 | 1/1987 | Goodwin, Jr. | 364/200 |
| 4,748,556 | 5/1988 | Hoerea et al. | 364/200 |
| 4,779,194 | 10/1988 | Jennings et al. | 364/200 |
| 4,796,178 | 1/1989 | Jennings et al. | 364/200 |
| 4,819,234 | 4/1989 | Huber | 371/19 |
| 4,833,629 | 5/1989 | Moore | 364/555 |
| 4,835,685 | 5/1989 | Kun | 364/200 |
| 4,835,733 | 5/1989 | Powell | 364/900 |
| 4,851,987 | 7/1989 | Day | 364/200 |
| 4,855,936 | 8/1989 | Casey et al. | 364/521 |
| 4,866,665 | 9/1989 | Haswell-Smith | 364/900 |
| 4,879,646 | 11/1989 | Ivasaki et al. | 364/200 |
| 4,912,628 | 3/1990 | Briggs | 364/200 |
| 4,916,608 | 4/1990 | Shultz | 364/200 |
| 4,918,653 | 4/1990 | Johri et al. | 364/900 |
| 4,992,936 | 2/1991 | Katada et al. | 364/200 |
| 5,023,773 | 6/1991 | Baum et al. | 364/200 |

FOREIGN PATENT DOCUMENTS 0297339  1/1989  European Pat. Off. .

OTHER PUBLICATIONS

IBM TDB, vol. 33, No. 5, Oct. 1990, "Variable Length, Multi-user, Continuous Input/Output Processor Trace", pp. 57–60.

IBM TDB, vol. 30, No. 11, Apr. 1988, "Subroutine Call/Return Stack", pp. 221–225.

IBM TDB, vol. 31, No. 4, Sep. 1988, "Dynamically Reconfigurable N-Way Microsequencer", pp. 44–47.

(List continued on next page.)

Primary Examiner—Thomas G. Black
Assistant Examiner—Jack M. Choules
Attorney, Agent, or Firm—Arthur J. Samodovitz

[57] ABSTRACT

A computer operating system manages events defined by an application program or another part of the operating system. Each event definition includes one or more attributes of the event which controls some operating system responses to an occurrence of the event. After an occurrence of a defined event, an application program or another part of the operating system signals an event manager. The event manager reads the corresponding event definition to determine a mode of operating the signaller of the event or a process associated with the event signaller. The operating modes include a synchronous mode whereby the event signaller or the associated process should suspend processing until the event is handled, and an asynchronous mode whereby the event signaller or associated processor can continue processing while the event is being handled. After reading the event definition, the event manager advises the event signaller whether to proceed synchronously or asynchonously. After the event is handled, a suspended event signaller is restarted. The event definition can be updated dynamically.

20 Claims, 20 Drawing Sheets

OTHER PUBLICATIONS

IBM TDB, vol. 29, No. 11, Apr. 1987, "Communicating Event Information Between Applications In A Multitasking Environment", p. 4832.

IBM TDB, vol. 29, No. 5, Oct., 1986, New York, NY, "Virtual Interrupt Mechanism", pp. 1891–1895.

Mini Micro Systems, vol. XX, No. 4, Apr. 1987, Boston, US, "Intel's 386 Unities Unix and DOS Software", pp. 113–124, Cliff Purkiser, Intel Corp.

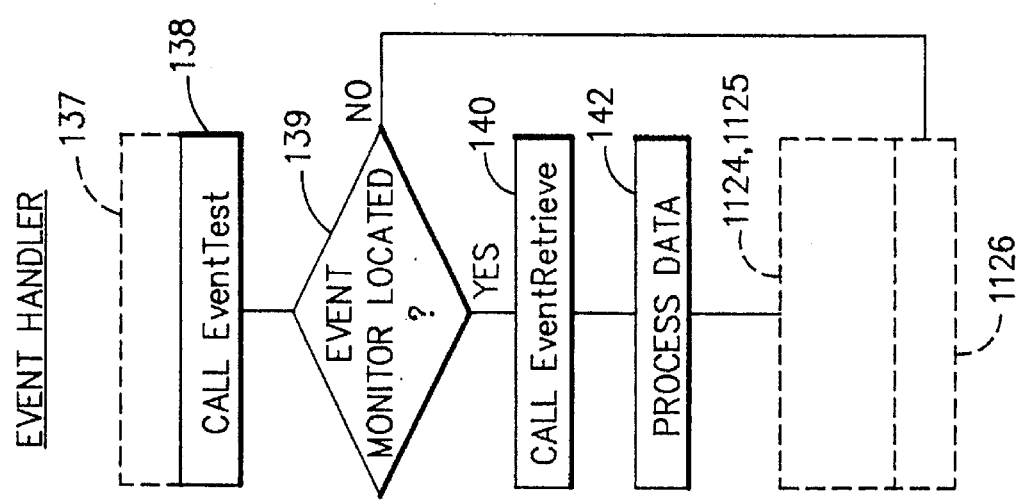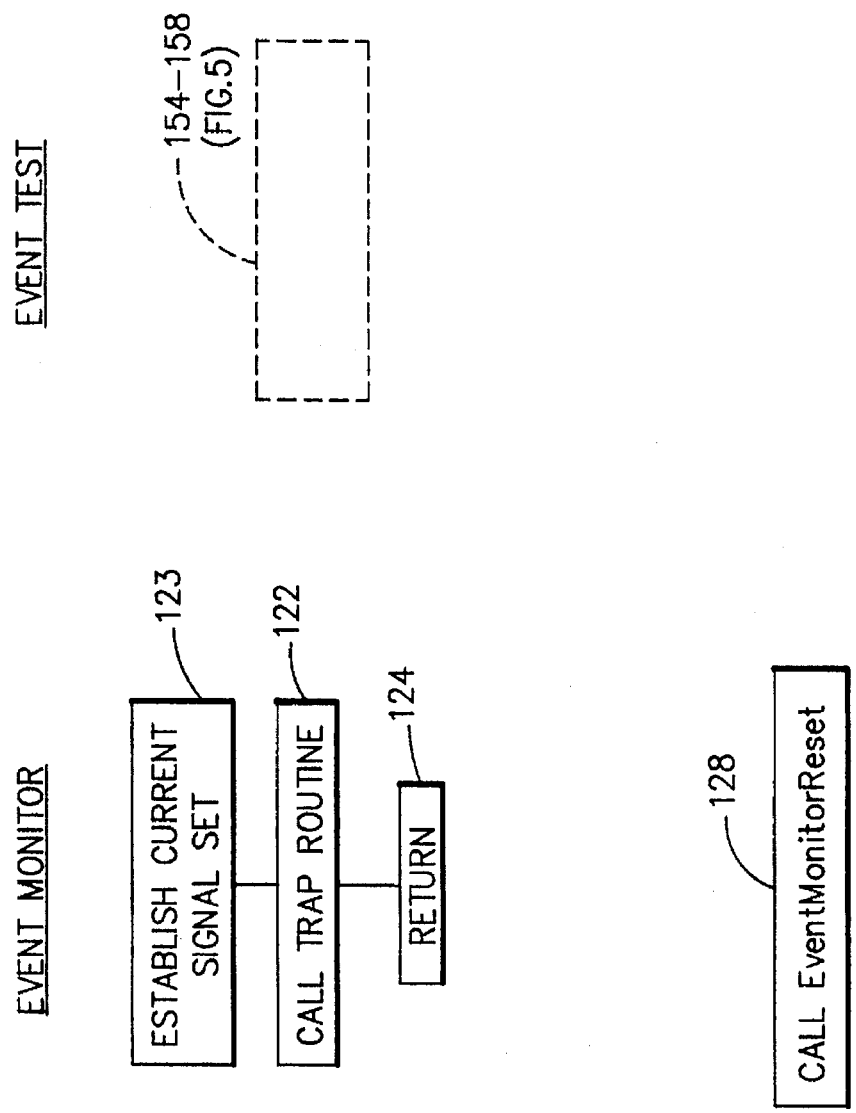
FIG.6(b)

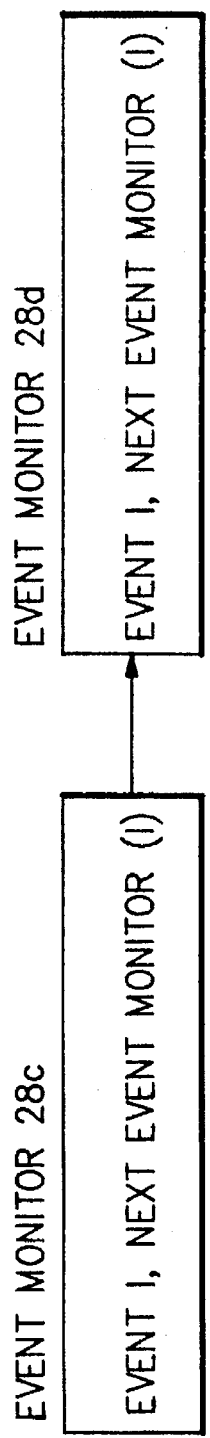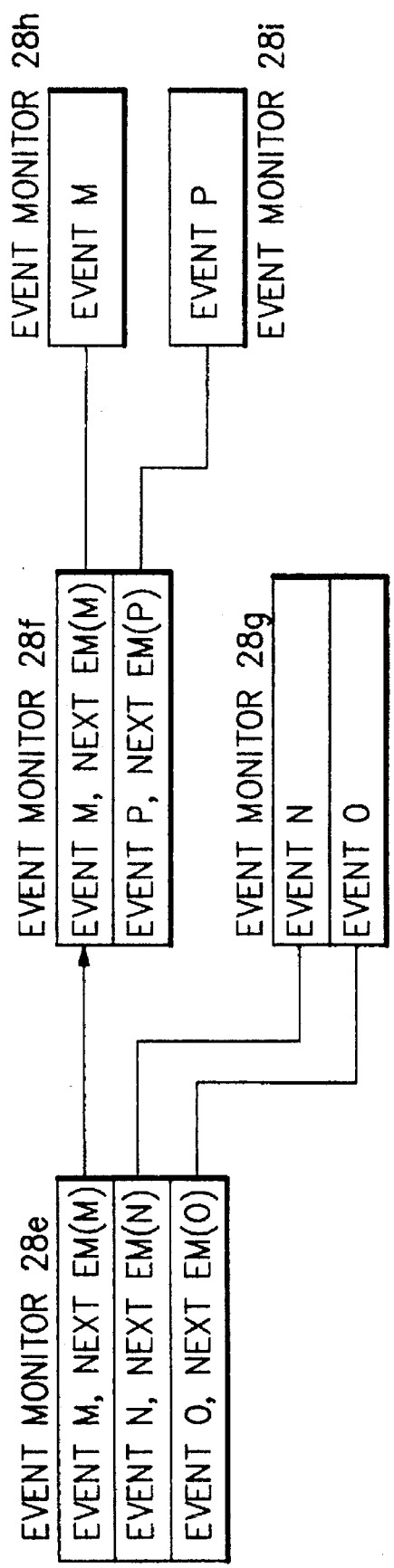

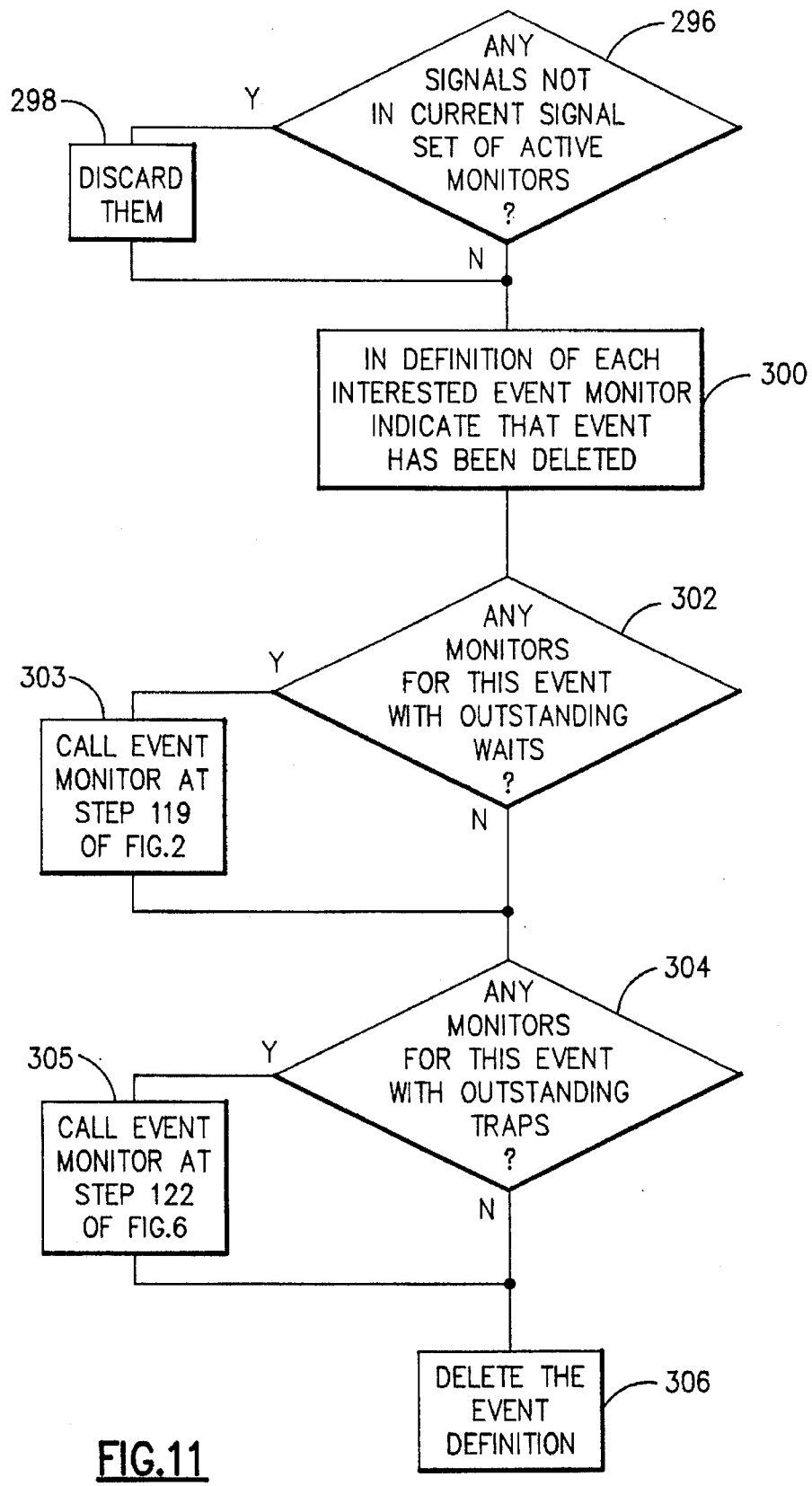

ASYNCHRONOUS OR SYNCHRONOUS OPERATION OF EVENT SIGNALLER BY EVENT MANAGEMENT SERVICES IN A COMPUTER SYSTEM

BACKGROUND OF THE INVENTION

The invention relates generally to computer operating systems, and deals more particularly with event management services within a computer operating system.

During the course of operating a computer system, many types of events can occur, for example, pressing of an enter (function) key on a keyboard, loading of data from a disk into memory, or occurrence of severe errors or trace events, etc. Data may be associated with the event such as a character key that was pressed before the enter key or the name of the disk that was loaded. Previously known operating systems manage events such that when the event occurs, the operating systems notify one or more application programs executing within the system that are interested in the event and furnish associated event data, if any. After notification, the application program or programs can process the event data, or take other action in response to the event notification.

A prior art IBM System/38 operating system manages events in the following manner. Each of the events is defined with a name from a predetermined set of numerical names, consisting of a class, type and subtype. The operating system reserves certain of the predetermined names to represent common hardware and software events, and makes the other names available to application programs to identify other events. Application programs also can dynamically define event monitors to receive notification of defined events. When the event occurs, the operating system or the application that detects the event calls an EventSignal function, and then continues with other processing. The EventSignal function signals one or more of the event monitors which are interested in the event, i.e. all of the event monitors which name events having the same class, type, and subtype identification as found in the event definition. Generic type and/or subtype specifications are also allowed. If there is more than one interested event monitor, the EventSignal function signals the interested event monitors in a broadcast mode, i.e. substantially simultaneously. Then, the event monitor(s) notify respective event handling subroutines of application program(s) which are interested in the event, to act upon the event notification and/or process the event data.

The event handlers operate synchronously or asynchronously relative to the occurrence of the events. In an asynchronous "trap" mode, the event handler requests notification of an event but does not wait idly for the event to occur if it has not yet occurred. When the event occurs and the respective event monitor is signalled, the event monitor notifies the event handler by sending an interrupt followed by the event data. In a synchronous "test" mode, the event handler periodically asks the event monitor whether the event has occurred, and if so, responds to the event and/or processes event data. If the event has not occurred, then the event handler performs other work. In a synchronous "trap" mode, the event handler requests the event notification and event data once, waits in a sleep mode until the event occurs; and is awakened with the event notification. The System/38 operating system also supports dynamic enabling and disabling of event monitors. A disabled event monitor will not notify the corresponding event handler of an event. Also, in the System/38 operating system, it is possible to mask an event handler against receipt of event signals.

Certain types of events such as program trace events are generated periodically. The System/38 operating system allows specification of a maximum number of events and associated event data to be retained, tied to an interested event monitor, or specification that the events and associated event data should be retained without limit while an interested event monitor is disabled. In the former case, when the maximum number of events and associated event data is exceeded, subsequent new events and associated event data which exceed the maximum level are discarded.

While the System/38 operating system provides a substantial amount of control and efficiency in managing events and permits associated application programs to participate in defining the event management services, further improvements are desirable to permit an operating system to more efficiently and more comprehensively manage the events according to the specific requirements of the computer system and the associated application programs.

Accordingly, a general object of the present invention is to provide event management services which efficiently and comprehensively manage events and permit associated application programs and other parts of the computer system to tailor the event management services to their specific needs.

Another object of the present invention is to provide event management services of the foregoing type which permit associated event signallers, event definers and/or event handlers to operate in an efficient and optimum manner.

SUMMARY OF THE INVENTION

The invention resides in a computer operating system which manages events. An application program or another part of the operating system defines an event. Each event definition includes one or more attributes of the event which controls some operating system responses to an occurrence of the event. After an occurrence of a defined event, an application program or another part of the operating system signals an event manager. The event manager reads the corresponding event definition to determine a mode of operating the signaller of the event or a process associated with the event signaller. The operating modes include a synchronous mode whereby the event signaller or the associated process should suspend processing until the event is handled, and an asynchronous mode whereby the event signaller or associated processor can continue processing while the event is being handled. After reading the event definition, the event manager advises the event signaller whether to proceed synchronously or asynchronously. After the event is handled, a suspended event signaller is restarted. The synchronous mode is particularly useful when the event handler is an "exit routine".

According to another feature of the present invention, each event definition includes other attributes such as a specification of a number of event signals to be stored when there is no program which is currently interested in the event, and the event definition can be received or updated dynamically throughout operation of the operating system.

BRIEF DESCRIPTION OF THE FIGURES

FIG. 9 is a block diagram illustrating chaining of two event monitors within the operating system of FIG. 1, which event monitors are both interested in the same event.

FIG. 10 is a block diagram illustrating chaining of five event monitors within the operating system of FIG. 1, which event monitors are interested in different sets of events.

FIG. 11 is a flowchart illustrating an EventDelete function of the operating system of FIG. 1.

DETAILED DESCRIPTION OF THE PREFERRED EMBODIMENTS

Figure 1:
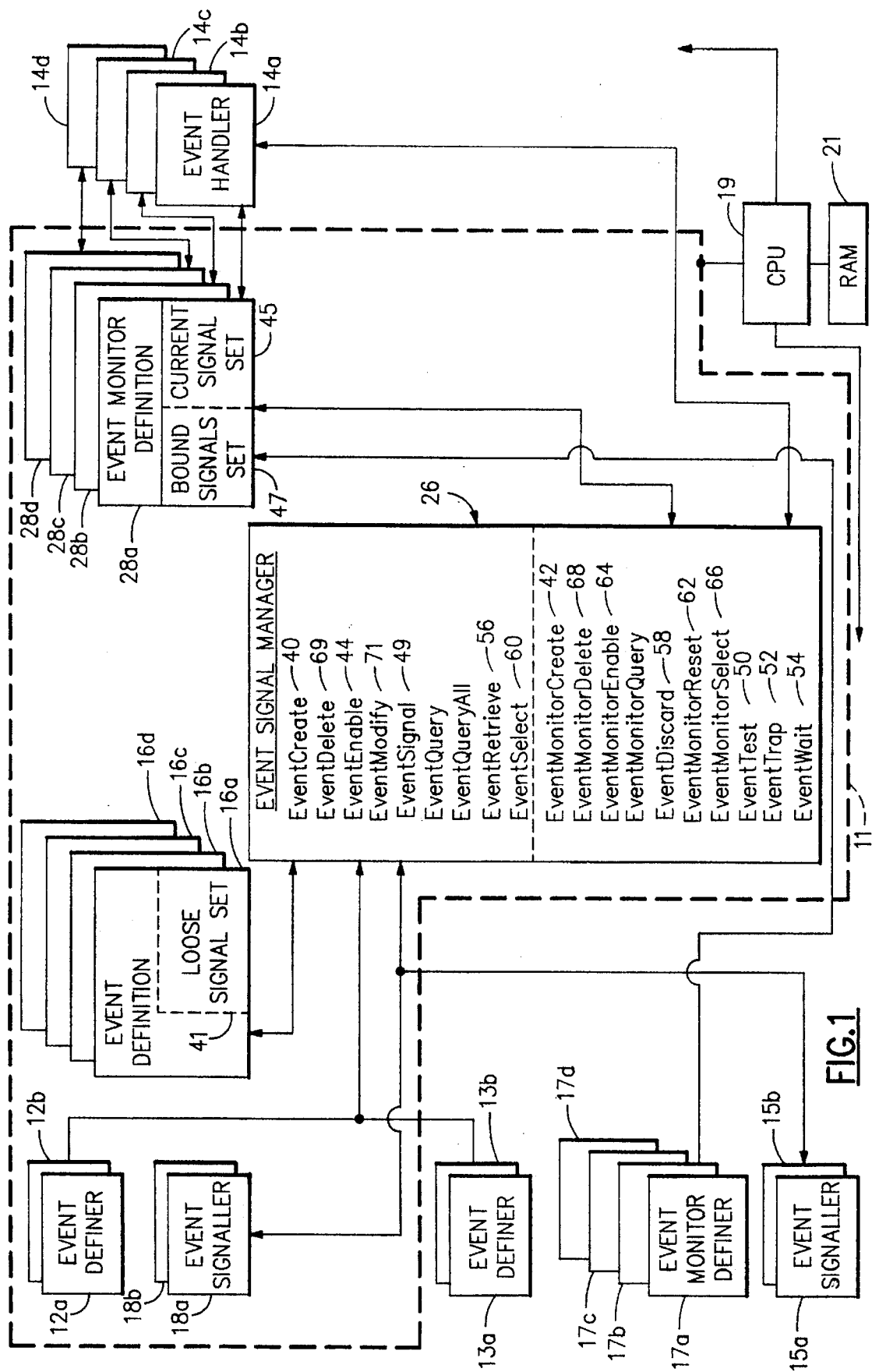
FIG. 1 is block diagram illustrating key components of an operating system providing event management services according to the present invention, and associated application program threads and hardware.

Referring now to the drawings in detail wherein like reference numerals indicate like elements throughout the several views, FIG. 1 illustrates an event management services portion of a multitasking operating system generally designated 11 according to the present invention. The operating system 11 is preferably programmed in executable form onto a computer readable medium such as a magnetic disk or tape, loaded into the computer memory 21 and executed on a CPU 19. However, the operating system 11 or part thereof could also be implemented by equivalent hardware.

Operating system 11 and associated application programs provide many functions which are described in more detail below. The functions can be grouped into the following categories: event defining, event signalling, event monitor creating, event monitoring, event monitor processing and event handling.

An event definition includes an event name to identify the event and attributes of the event to control some operating system responses to the event. The operating system only recognizes the defined events.

The operating system or application program signals an event to communicate the occurrence of the event. The event signal is always associated with the process which signals the event. An event can be defined so that its signal is recognized only within this process or else throughout the entire session containing this process. The event signal can include data associated with the event and a key which specifies particular occurrences of the event or a subset of types of event data such as the source of the data.

If an application program or other function within the operating system 11 is interested in receiving notification of an event and the event data, if any, the application program or other operating system function defines an event monitor. The definition specifies one or a combination of events, of the same or different type, of interest to the event monitor. In the embodiment of the present invention described herein in detail, if more than one occurrence of the same type of event is required to satisfy the event monitor, then the event type is listed more than once in the event monitor definition. (Alternately, each event type can be listed just once in the event monitor definition, and a count provided for each event type to indicate the minimum number of events of that type required to satisfy the event monitor.) The definition can also specify a key with each event name to limit the event occurrences of interest to the event monitor. The event monitor can monitor event signals provided by other program threads within the same process or signals of events which have been defined with session scope. The event monitor definition also specifies the number or "count" of distinct event signals, i.e. the number of the specified events which must have occurred at least once, which are required to "satisfy" the event monitor. Only when the event monitor is satisfied will the event monitor give the associated event handler access to stored event signals. To provide such access, the event handler makes a request to the event monitor, and if the event monitor is satisfied, the event monitor will notify the event handler that the event monitor is satisfied and the location of the stored event signals. This request can take the form of an EventTrap, EventWait or EventTest call. After receiving notification that the event monitor is satisfied, the event handler can retrieve and process the event data. The manner of interpreting the event data is based on a private protocol between the event signaller and event handler, and is established separately for each named event. The event management services within operating system 11 provides a channel for delivering the event notification and event data to the event handler. After the event handler retrieves and processes the event data, the event monitor must be reset before the event handler can retrieve and process new event signals.

The event management services within operating system 11 comprise event definers 12a,b, resultant event definitions 16a–d, event monitors 28a–d, event signallers 18a,b, and an event signal manager 26. Although not shown, the operating system 11 could also include event monitor definers and event handlers. FIG. 1 also illustrates event definers 13a,b, event signallers 15a,b, event monitor definers 17a–d, and event handlers 14a–d, within respective application program threads that run on operating system 11. While each of the foregoing application program threads 13a–d, 14a–d, 15a,b and 17a–d may be a member of a different computer process, typically each pair of event monitor definers and event handlers (17a, 14a), (17b, 14b), (17c, 14c) and (17d, 14d) is part of the same process, and either each pair of event definers and event signallers is part of the same process or resides within operating system 11, or the event definer is within the operating system and the event signaller is outside the operating system as an application program.

The following is a high level description of the operation of operating system 11 and associated application program threads. The event signallers 18a,b and 15a,b detect the occurrence of events, and signal the event signal manager 26 with an indication of the occurrence of the event, the event name, event key (i.e. subset of types of event data accompanying the event) and specific event data. In response, the event signal manager compares the name of the signalled event to those in the event definitions 16a–d to determine if the named event has been defined and, if so, to read attributes of the event. The attributes indicate whether the event signaller must be required to wait for the event to be handled before proceeding with other work or whether the event signaller must be permitted to proceed with other work during event handling, a maximum number of event signals that can be stored if there are currently no event monitors which are interested in the event, and a broadcast or propagation mode for notifying multiple event monitors which are interested in the event. Based on the first attribute, the event signal manager either causes the event signaller to wait for event handling to be completed or permits it to continue processing before event handling is completed. The event signal manager also reviews the definitions of event monitors 28a–d to determine if one or more event monitors have been defined which reference, i.e. are interested in, the named event with limiting event key. If not, the event signal manager stores the event signal, tied to the event definition, in accordance with the second attribute of the event definition. However, if at least one event monitor is interested in the named event with limiting event key, the event signal manager signals the event monitor with the event notification and event data. If there are two or more interested event monitors, then the event signal manager signals the interested event monitors in the broadcast or propagation mode as specified in the event definition. The event monitor definition indicates the maximum number of signals of each listed event that can be stored bound to the event monitor for subsequent transmission to the interested event handler, and the number of distinct event signals required to "satisfy" the event monitor. If satisfied, each signalled event monitor is eligible to notify the respective event handler of the event upon request by the event handler in the requested manner, i.e. wait, trap or test mode. The event handlers respond to the event notification and/or process the event data, if any.

The following is a more detailed description of the present invention. The operating system can define events such as process creation, process deletion, begin command, end command, command not found, reset, program load, program unload, console output complete, console input available, error, timer, trace, I/O and accounting events. An error event is, for example, a program check, a severed connection or other system failure. A timer event is the end of a timing period. A trace event is the completion of a program subroutine, thread or significant step of a program (for example, accessing data, sending data, dispatching a new thread, suspending a thread, etc). An accounting event is use of the computer system which may result in a charge to the user. The application programs can define any type of event such as the completion of a function, a checkpoint in the function, data creation, data deletion, application program error events (ex. a user entry error) or a request for responsive action. For example, if the application program wants to control a robotic arm, the application program can define an event which is a request to move the arm, and subsequently signal the event, i.e. the request, and provide event data to define how much and in what direction to move the arm. The operating system or the application programs can define the events at any time, i.e. during session initialization, at first invocation of a service that detects the event, or at any other time. Each event is defined by calling an EventCreate function 40 within event signal manager 26 and specifying definition parameters. The call for this function and each other function within event signal manager 26 is described in detail in a section entitled "Event Signal Manager Function Calls" below.

Figure 2A:
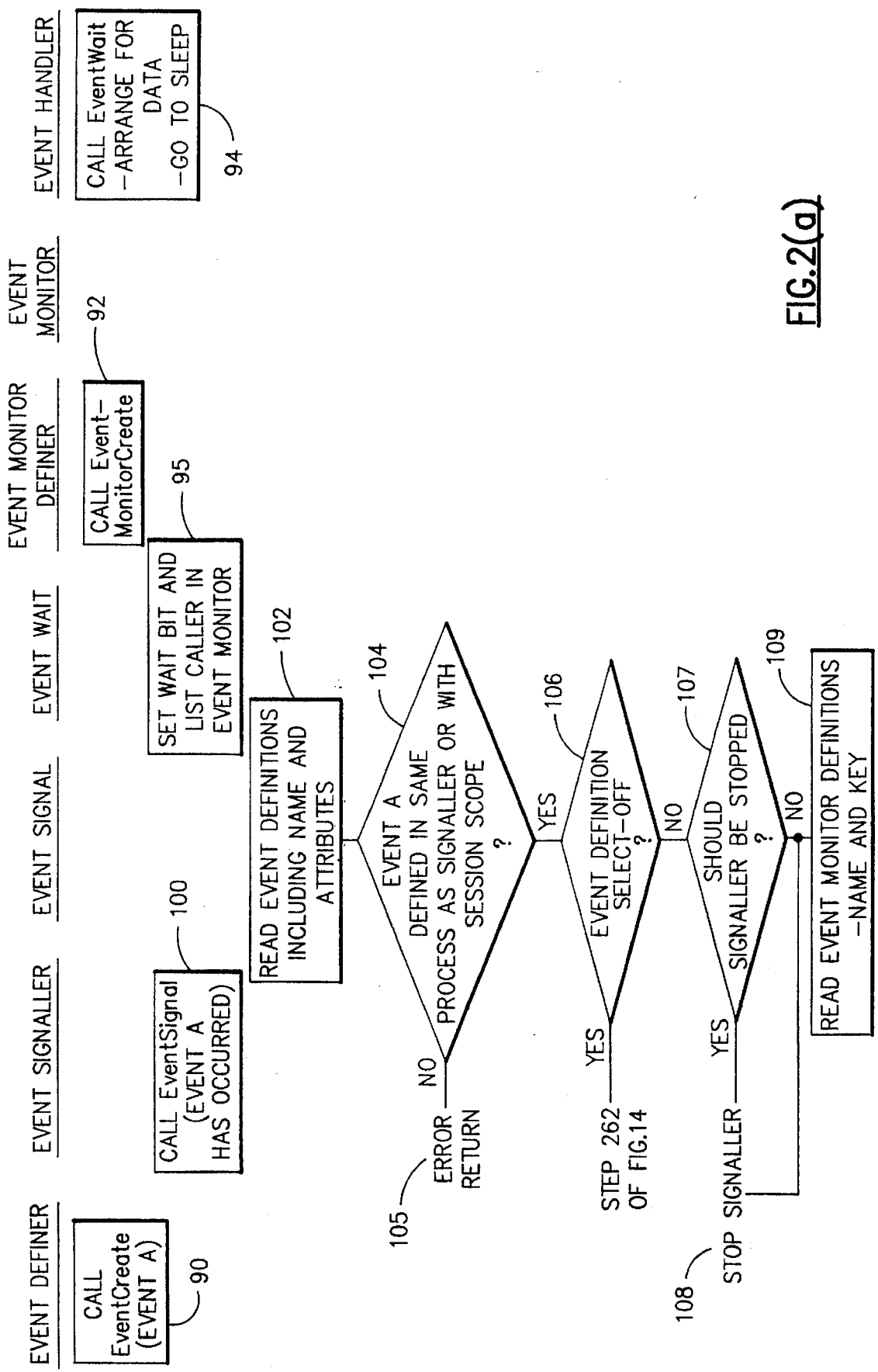
FIGS. 2(a–c) form a flowchart illustrating operation of the operating system of FIG. 1 when an event occurs and an interested application program thread, while in a wait mode, is notified of the event.
Figure 2B:
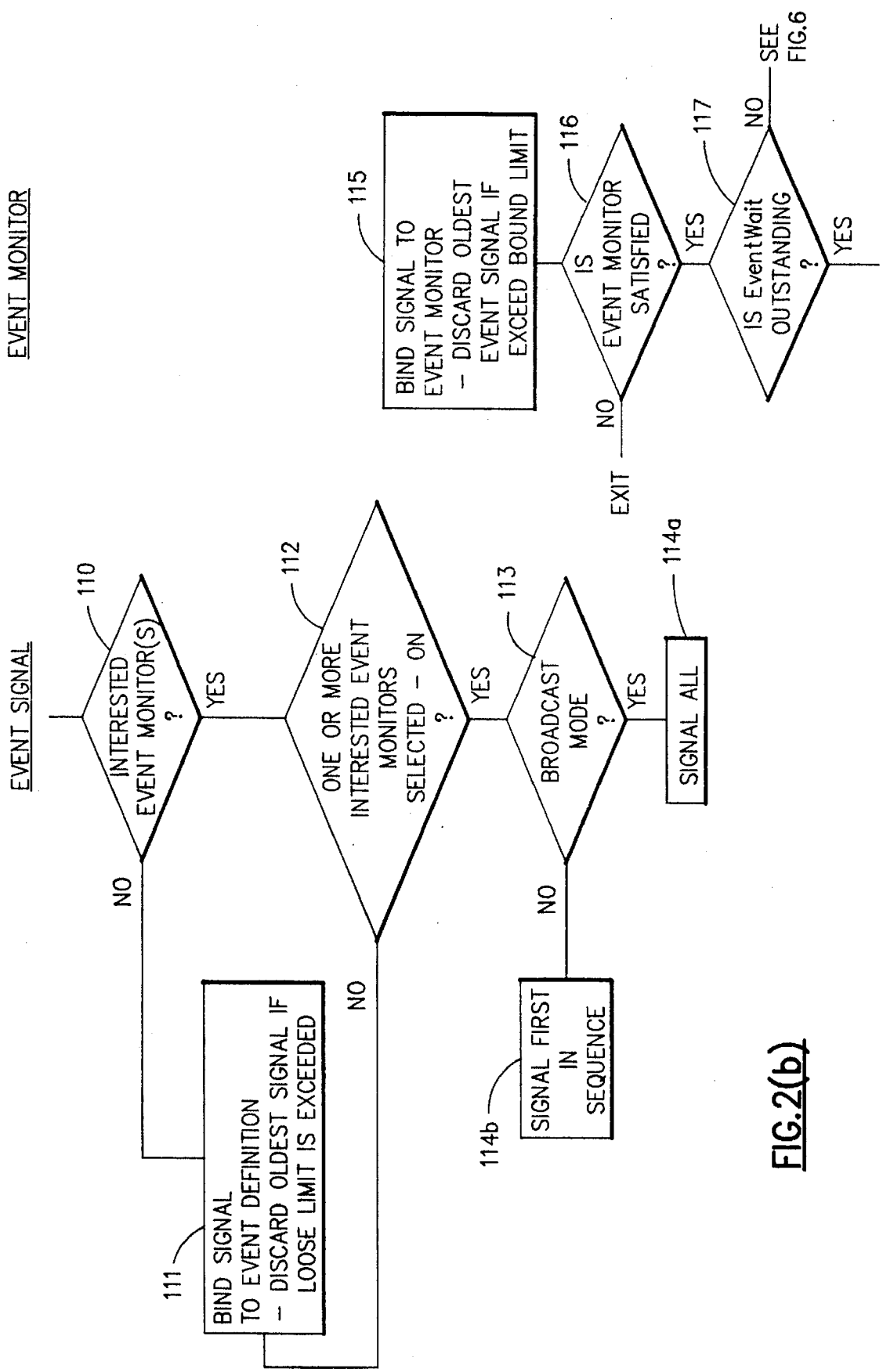
Figure 2C:
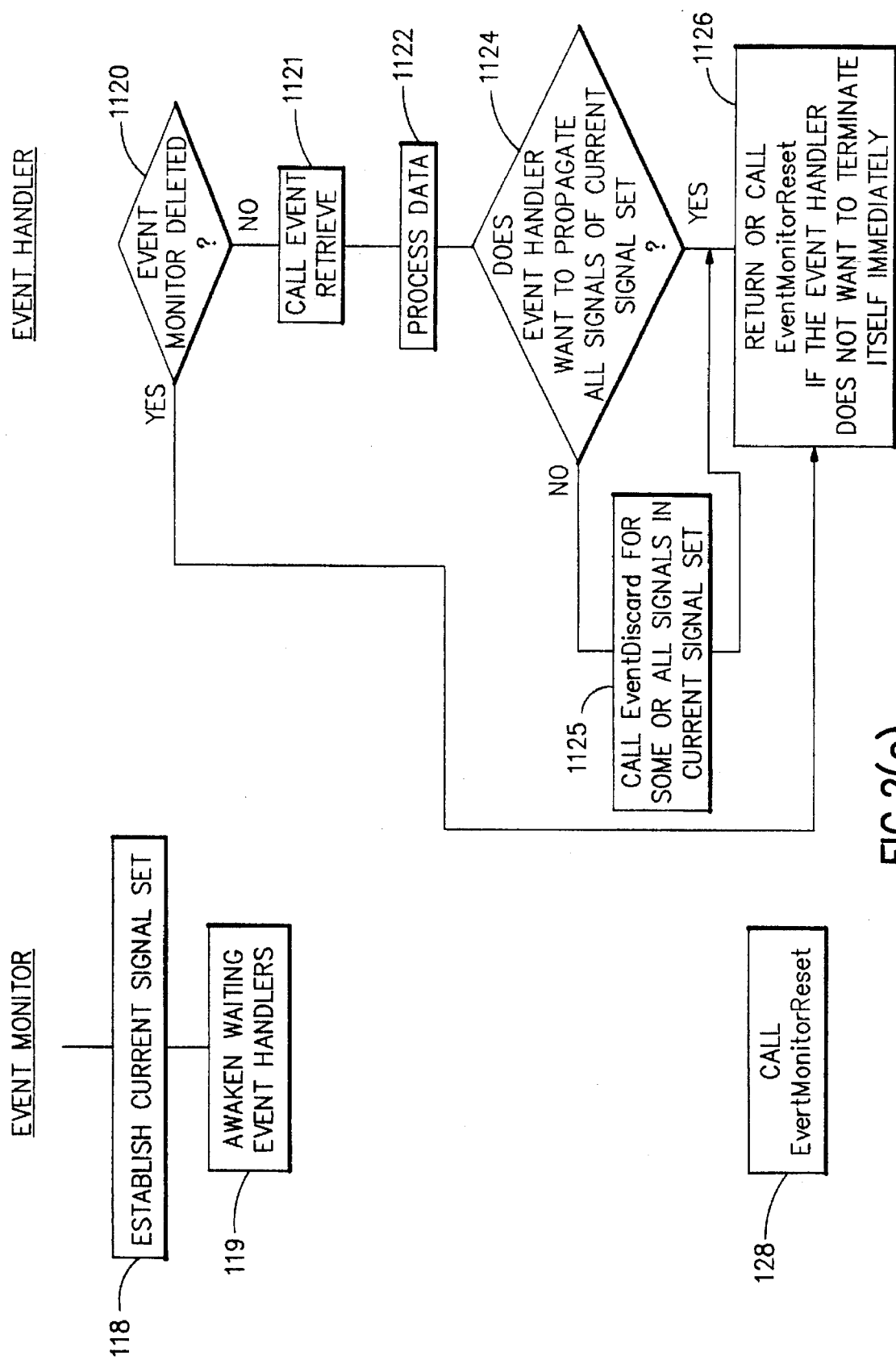

Based on the parameters in the call, each event definition 16a–d includes an event name and important attributes or characteristics of the event. Each event name is a character string having a length and composition determined by the event definer, and provides the primary identification of the event. The attributes include scope of the event name, loose signal limit, mode of signalling the interested event monitor (s) 28a–d, and operational status of the respective event signaller 15a,b or 18a,b during the event notification and processing. The event definition also includes enable and select fields as described below with reference to FIG. 12 and 14. Also, as described in more detail below with reference to FIG. 2a–c, the event signaller calls an EventSignal function 49 within the event signal manager which reads the attributes of the named event to determine in part how to manage the event.

The scope of the event name attribute indicates either a single process or an entire session in which the event name has significance. If an event name has process scope only, then only the process which defined the event may signal the event and only those event monitors defined in that process which reference the event name can be signalled by the EventSignal function. However, if an event name has session wide scope, then all event monitors that reference the event name can be signalled by the EventSignal function after receiving the event signal regardless of what process signalled the event. Each event name having session wide scope must be unique within the system; however, each event name having process scope need only be unique within the process that signals and monitors the event.

The loose signal limit attribute is the number of events and associated event data ("loose signals" 41) that are stored at the direction of the EventSignal function in association with the corresponding event definition after the event is defined and the event occurs, but in the absence of any event monitors that are currently interested in the event. After the loose signal limit of event signals is reached, each subsequent event signal is stored at the expense of the oldest event signal which is then erased. The storage of loose signals is important because an event monitor may be defined later which is interested in the event and benefit from the previous event signals.

The mode of signalling attribute refers to the manner of signalling more than one event monitor that is interested in the same event. In a broadcast mode, the EventSignal function signals all interested event monitors without contingency, usually at substantially the same time. The event definition should indicate the broadcast mode when all of the interested event monitors can benefit from the event notification and event data regardless of the nature of the event. For example, if the event is the loading of data from a disk into memory and there are multiple event handlers which are interested in reading the data, then it is most efficient to broadcast the event notification and event data to the event handlers (via the associated event monitors) soon after the occurrence of the event and without any contingency so that those event handlers may be dispatched by the operating system for optional concurrency. In a FIFO propagation mode, the event monitors are subject to notification in order of creation of the event monitors, and in a LIFO propagation mode, the event monitors are subject to notification in reverse order of creation of the event monitors. The event handler associated with each event monitor that is signalled controls whether the next event monitor in the sequence is signalled as to the occurrence of the event. To do this, each event handler that receives the event signal calls an EventMonitorReset function to permit propagation of specified event signals in the current signal set to the next event monitor in the sequence. Each event handler in the sequence can also call an EventDiscard function to prevent propagation of one or more event signals to the next (and all downstream) event monitors in the sequence. Event signal propagation rules are applied on a process basis; when interested event handlers reside in different processes, the event signal is always delivered to at least one event monitor in each of the processes. This control is described in more detail below with reference to FIGS. 7 and 8, and permits each event handler in the sequence to avoid processing of the event data by subsequent event handlers in the sequence when the event handler determines that the system will not benefit by propagation of the event signal. For example, assume that the event is a severe failure, a function of the first event handler in the sequence is to analyze the nature of the failure, and a function of the next event handler in the sequence is to recover from the failure. If the failure is so severe that recovery is not possible, then the first event handler should block the propagation of the event signal to the next event handler in the sequence. Thus, the effect of the blocking is to improve the overall efficiency of the system.

The operational status attribute within the event definition refers to the synchronous or asynchronous treatment of the process which signals the event while the EventSignal function signals the event monitor, the event monitor notifies the event handler, and the event handler acts upon the event and processes the event data. For example, if the event is an error in the process that signalled the event, then it may be preferable to suspend the process that signalled the event (synchronous treatment) until the error is recovered by the interested event handler. However, if the event represents normal operation of the event signaller and the event signaller should be ready to process other similar events (asynchronous treatment), such as the pressing of a keyboard function key, then the event signaller process should not be suspended while the event monitor is signalled and notifies the event handler and the event handler processes the event data. If the event represents a "call" to an exit routine, then the process which signalled or called the exit routine should be suspended until the event is handled, and the event attribute should indicate the synchronous treatment. An exit routine is a block of code which is usually provided by a user of operating system 11 to perform a user-specific or installation-specific function. Such functions can be optional, additional or otherwise external to the operation of the product. If no event monitor for the exit routine event has been defined, then the calling program continues to execute and there is no system failure. Also, the exit routine can reside in a different process from the caller to shield the resources of the calling process from the exit routine. The event handler can provide an exit routine, in which case control typically should not return to the caller until the exit routine is executed; therefore, the exit routine should be defined as an event with the synchronous attribute.

The event monitor definers 17a–d (or other event monitor definers not shown, within operating system 11) define the event monitors 28a–d respectively by calling an EventMonitorCreate function 42 and specifying the event monitor parameters. Each call identifies one or more event names, respective event keys, the number of occurrences of distinct events to satisfy the event monitor, and a bound signal limit for each event and other attributes of the event monitor. The key may be a "wildcard" indicating that the event monitor is interested in all types of the named event, or may be a subset of the types of named events. The event monitor definition also includes enable, select, delete, wait and trap fields described below. As described above, after receiving the name of the event and event key from the event signaller and verifying that the named event has been defined, the EventSignal function reads the event monitor definitions to determine which one or ones, if any, recite the event name and key. If one or more such event monitors have been defined, then the EventSignal function calls them in the broadcast or propagation mode as specified in the event definition.

The use of the keys simplifies the definitions of the events which can list a general event name such as the pressing of an enter key or the loading of a disk into memory, while the event monitor definition limits the event signalling to the event monitor based on the key within the event monitor definition. For example, the event monitor key may be limited to a specific set of character keys or type of loaded disk.

The next attribute listed above in the event monitor definition, the number or count of distinct event signals required to satisfy the event monitor, causes the event monitor to withhold notification of the event signals to the associated event handler until after the specified number of distinct events named in the event monitor definition have occurred. For example, an event handler which has the function of recovering communication errors may be interested in receiving notification of the errors only when a total of ten communication facility errors and/or parity errors have occurred in order to justify further analysis; a lesser number of the errors may not be deemed significant enough to initiate recovery. In this embodiment of the present invention, if the communication error is listed ten times and the parity error is listed ten times and the count is specified as ten, the breakdown between the number of errors of each specified type is not critical to the satisfaction of the event monitor as long as a total of ten occurrences of either or both types have occurred. However, if the communication error is listed five times and the parity error is listed five times and the count is ten, then five of each type of event must occur to satisfy the event monitor. Thus, the event monitor definer can specify a particular number of occurrences of each event type of interest required to satisfy the event monitor.

The last attribute listed above in the event monitor definition, the bound signal limit, is the number of unprocessed event signals that can be stored at the direction of the interested event monitor, bound to or associated with each designated event in the interested event monitor. When the limit is exceeded, the oldest bound event signal is erased, and the newest event signal is bound to the event monitor. For example, a bound signal limit for the storage of a fixed number of trace events and data is useful to assist in trouble shooting an event condition, whereas additional, older trace data may not be useful because it may not reflect current problems. The bound signals are stored in a bound signal set 47. When an event monitor is satisfied and an event handler requests event notification, the event monitor designates the oldest bound distinct event signals as a current signal set 45 for access by the event handler. If more than one occurrence of the same type of event is required to satisfy the event monitor, then the current signal set includes at least the number of event signals for the type as required to satisfy the event monitor.

Another attribute in the event monitor definition specifies whether or not the event monitor, when created, should receive signals of the type or types in which the event monitor is interested but which occurred before creation of the event monitor and are stored in the loose signal set. If so, the loose signals are transferred to the bound signal set 47 upon creation of the event monitor. Still another attribute in the event monitor definition specifies whether or not other program threads within the same process as the event handler should be suspended after the event monitor is satisfied and while the event handler receives the event notification and handles the event. It may be important to suspend execution of the other program threads if the event is a system failure which requires an abend or an event which requires the event handler to take a "snapshot" of the entire process.

As noted above, typically each event monitor definer and associated event handler are part of the same process so that when a process wants to monitor an event or combination of events and handle the event or combination, the process defines the event monitor and provides an associated event handler that is notified pursuant to a call by the event handler to the EventTest, EventTrap or EventWait function. The process can define or delete the event monitor and involve the event handler dynamically, i.e. at any time without relinking or interrupting other programs, by calling the EventMonitorCreate or EventMonitorDelete function and the EventTest, EventTrap or EventWait function. Also, multiple processes can define multiple event monitors and provide multiple event handlers for the same or different events or combinations of events.

Figure 17:
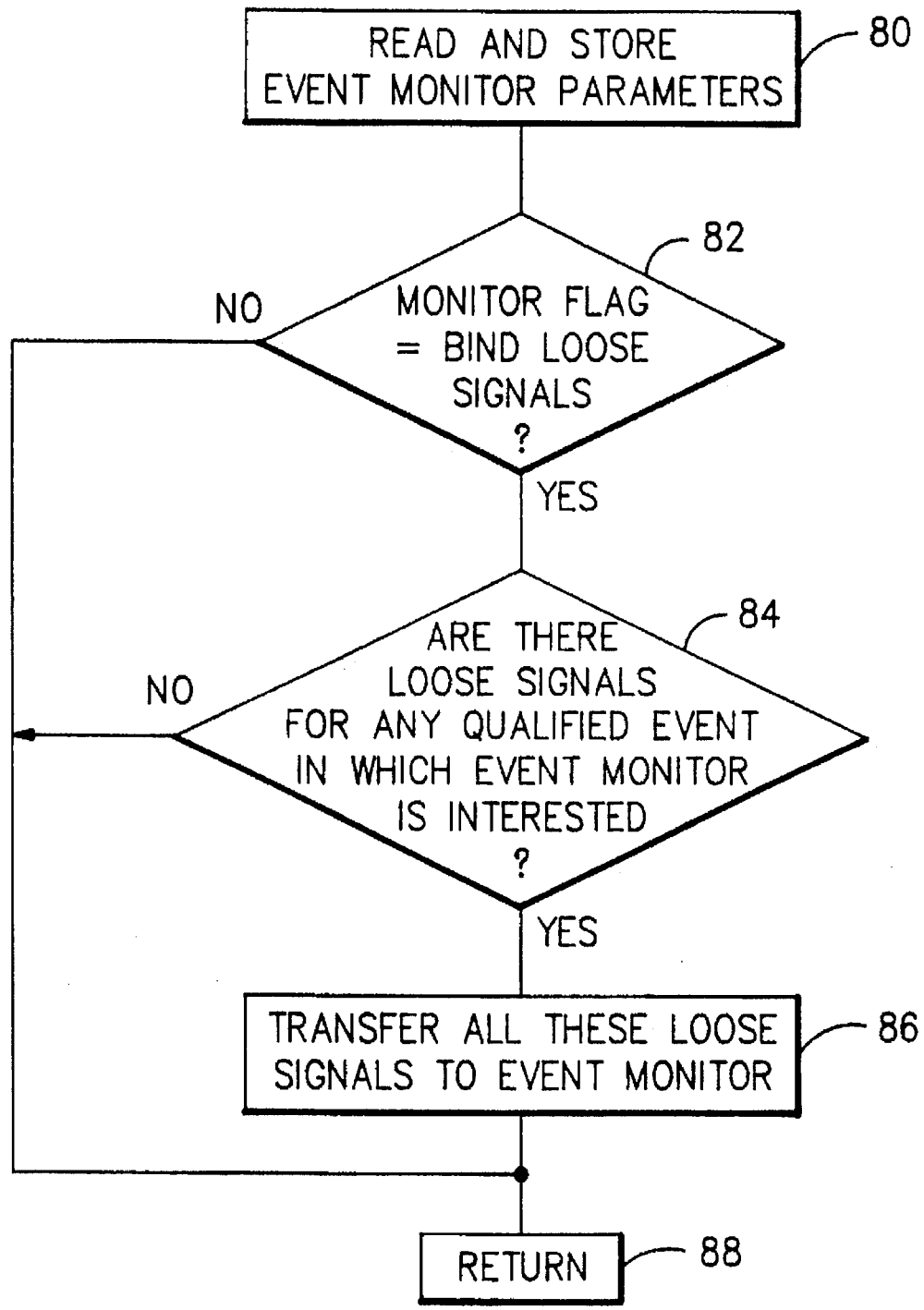
FIG. 17 is a flowchart illustrating an EventMonitorCreate function of the operating system of FIG. 1.

After receiving the call, the EventMonitorCreate function reads and stores all the parameters in the call (step 80 of FIG. 17). Next, the EventMonitorCreate function determines if an event monitor flag parameter indicates that loose signals should be bound (decision block 82). If so, the EventMonitorCreate function reads the loose signal set associated with the definition of each event of interest to the event monitor to determine if there are loose signals with limiting key ("qualified events") of interest to the event monitor. To be of interest to the event monitor, the loose signals must either have session scope or have process scope with the event being defined by the same process that defined the event monitor. If there were no prior occurrences of the event or if another event monitor was previously defined to have interest in the event, then there will be no loose signals. If there are loose signals of interest, the EventMonitorCreate function transfers all these loose signals to the event monitor (step 86), and the event monitor binds them to itself in accordance with its bound limits as described below with reference to step 115 of FIG. 2. Then, the EventMonitorCreate function returns to its caller (step 88).

At any time after an event monitor definer 17a–d defines an event monitor, the associated event handler can request notification when the event monitor is satisfied. The types of requests include test, trap and wait modes, and the event handler selects the desired mode with a call to an EventTest function 50, EventTrap function 52, or EventWait function 54. The effect of each call depends of the state of the respective event monitor.

If the event monitor is not yet satisfied, then the following occurs:

1) The EventTest function, if called by the event handler, reports to the event handler the state of each event name-event key pair (referenced in the event monitor associated with the event handler), i.e. whether the named event with appropriate key has occurred or been deleted.
2) The EventWait function, if called by the event handler, suspends the event handler until the event monitor is satisfied. When satisfied, the event monitor awakens the event handler and reports the state of each of the event name-event key pairs.
3) The EventTrap function, if called by the event handler, informs the operating system that a trap routine should be run when the event monitor is satisfied. Because the operating system does not know in what environment the trap routine will run, no information regarding the condition of the event monitor is initially passed to the trap routine. Therefore, when the event monitor is satisfied, the event monitor invokes the trap routine and the trap routine calls the EventTest function to obtain a report on the state of each event name-event key pair. If at the time the event monitor is satisfied, both an EventTrap and EventWait function have been called, the EventWait function takes precedence and the trap routine is not run.

If the event monitor is satisfied, but is not yet activated (i.e. not yet asked by an event handler for event notification), then the following occurs:

1) The EventTest function, if called by the event handler, activates the event monitor and causes the event monitor to establish the current signal set and report to the event handler the state of each event name-event key pair.
2) The EventWait function, if called by the event handler, activates the event monitor and causes the event monitor to establish the current signal set, awaken the event handler and report the state of each event name-event key pair.
3) The EventTrap function, if called by the event handler, causes the event monitor to establish the current signal set and run the specified trap routine.

An event monitor is "active" (after the event monitor is satisfied and an event handler has requested event notification) while the event handling program is executing as a result of a call to the EventWait function, EventTrap function or EventTest function. If the event monitor is currently active, then the following occurs:

1) The EventTest function, if called by the event handler, reports to the event handler the state of each event name-event key pair.
2) The EventWait function, if called by the event handler, resets the event monitor and suspends the event handler until the event monitor is again satisfied.
3) The EventTrap function, if called by the event handler, lists with the event monitor the address of the trap routine, overwriting the address of any trap routine previously associated with this event monitor.

When an event monitor is active, new event signals which it monitors are still bound to the event monitor and are processed by the event monitor after the EventMonitorReset function 62 is executed. Then, the event monitor examines the remaining bound signals, and if they are sufficient to satisfy the event monitor, the event monitor is again eligible for activation.

FIG. 2 is a flowchart illustrating operation of operating system 11, particularly the EventSignal function 49, event monitor 28a and event handler 14a, when the event handler calls the EventWait function 54. During step 90, the event definer 12a within the operating system defines an Event A (with session scope) although event definer 13a within an application program could just as well have defined Event A. For example, Event A is the pressing of an enter key on a keyboard following the pressing of a character key. Concurrently or at a later time, event monitor definer 17a within an application program defines an event monitor 28a which is interested in Event A by calling the EventMonitorCreate function (step 92). Later, event handler 14a calls the EventWait function 54 to indicate that the event handler will synchronously wait for event monitor 28a to be signalled of an event, and informs the EventWait function where the event data should be stored (step 94). In response to the call, the EventWait function sets a wait bit in event monitor 28a, lists the caller (event handler 14a) with the event monitor 28a (step 95), and renders the event handler in a sleep mode whereby it waits for the event notification without performing any other operations (step 94). At a later time, a person presses the character key and then the enter key, and a subroutine (event signaller 18a) which continually monitors the keyboard detects the pressing of the keys. In response, event signaller 18a calls the EventSignal function 49 and provides the event name, limiting key, if any, and event data (step 100). The EventSignal function 49 reads the event definitions 16a–d to determine if Event A has been defined in the same process as the signaller or with session scope (step 102 and decision block 104). If not, the EventSignal function returns an error code to the event signaller (step 105). However, in the illustrated example, Event A has been defined with session scope, and the EventSignal function notes in decision block 106 that the event definition is selected-on (as described below with reference to FIG. 14). Then, the EventSignal function decides, based on the event definition attribute, whether or not the event signaller should be stopped (synchronous treatment) until the event is handled (decision block 107), and if so, causes the event signaller to stop (step 108). In either case, the EventSignal function next reads the event monitor definitions 28a–d to determine if any event monitors are interested in Event A and whatever limiting key, if any, limits the interest of the event monitor (step 109 and decision block 110). If no event monitor is interested in the event and limiting key, the EventSignal function binds the signal to the event definition in accordance with the loose signal limit (step 111). If the loose signal limit has already been attained, then the oldest loose signal is discarded. If there are one or more event monitors which are interested in the event name with limiting key and are selected-on (decision block 112), the EventSignal function provides the event signal (event name and event data) to all of them nearly simultaneously if the event definition specifies the broadcast mode attribute (step 114a), or to the first event monitor in the sequence if the event definition specifies the propagation mode attribute (step 114b). In the illustrated example, there is only one event monitor which is interested in the named event with limiting key and is selected-on. However, if all event monitors that were interested in the event with limiting key were selected-off, then the event monitors would not be notified and the event signals would be bound to the event definition in loose signal set 41 (step 111). The signalled event monitor 28a binds the event signal to itself by storing the event signal in bound signal set 47. Next, the event monitor determines if it is satisfied by comparing the number of distinct event signals stored in the bound signal set 47 to an "event_count" field in the event monitor definition (step 116). The number of distinct signals of events of interest to the event monitor indicated by the event count must occur in order to satisfy the event monitor. As previously noted, one type of event can be listed more than once in the event monitor definition. In the alternate embodiment of the invention described above, in step 116, the event monitor determines if the specified number of occurrences of each event type have occurred to satisfy the event monitor. If the event monitor is not yet satisfied, no further action is taken by the event monitor or the associated event handler as a result of this occurrence of Event A. However, if the event monitor is satisfied, then the event monitor proceeds to determine if there is an EventWait call outstanding by reading the wait bit (decision block 117). In this example, the wait bit was set in step 95, and the event monitor then proceeds to establish a current signal set 45 by designating from the bound signal set 47 all distinct signals (step 118), and awakens the event handler listed by the EventWait function (step 119). Upon awakening, the event handler determines that the caller is the event monitor (and not an EventMonitorDelete function described below) (decision block 1120), calls an EventRetrieve function 56 to retrieve the alpha-numeric data stored in the current signal set (step 1121) and then processes the event data (step 1122). Next, the event handler decides whether any, all or none of the event signals in the current signal set should be available for propagation, even though the event handler 14a need not know if there are any other event monitors which are interested in any of the events or even if the event definition specified the propagation mode. If event handler 14a does not want to make any or all of the event signals available for propagation in any case, the event handler 14a calls the EventDiscard function 58 specifying event monitor 28a and any or all of the event signals in the current signal set to be discarded. This will block any possible propagation of the specified event signals from event monitor 28a's current signal set (step 1125).

Figure 3:
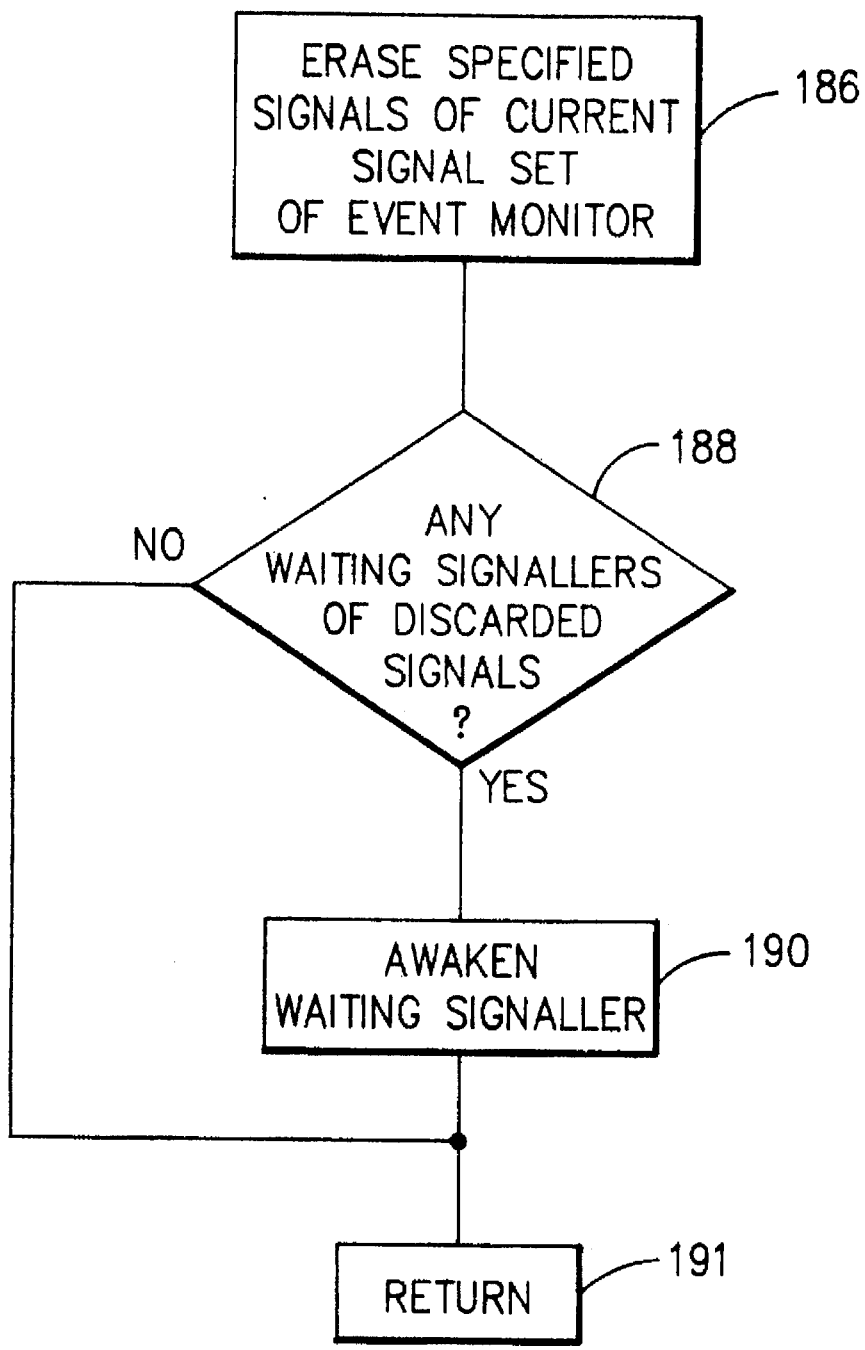
FIG. 3 is a flowchart illustrating an EventDiscard function of the operating system of FIG. 1.

When called, the EventDiscard function erases the specified signals from the current signal set of the named event monitor 28a (step 186 of FIG. 3). Next, the EventDiscard function determines if the event signaller(s) of the discarded event signal(s) are in the wait state pursuant to this attribute of the signalled event definition(s), and if so, awakens them (decision 188 and step 190). Then, the EventDiscard function returns to the event handler (step 191). After step 191, or if decision block 1124 indicates that the event handler made all the event signals available for propagation, the event handler can directly call the EventMonitorReset function illustrated in FIG. 4, or return to the event monitor which then calls the EventMonitorReset function. The event handler can also terminate itself in which case a function which assists in the termination will call the EventMonitorReset function. Normally, the event handler makes the return to the event monitor after steps 1120–1125. The event handler only calls the EventMonitorReset function directly to indicate termination of processing prematurely, for example, to allow a trap routine to be re-entered, or to allow an event monitor to be polled successively with the EventTest function. Also, because an event monitor is associated with an event handler, when the event handler is terminated, the event handler calls the EventMonitorReset function indirectly.

Figure 4:
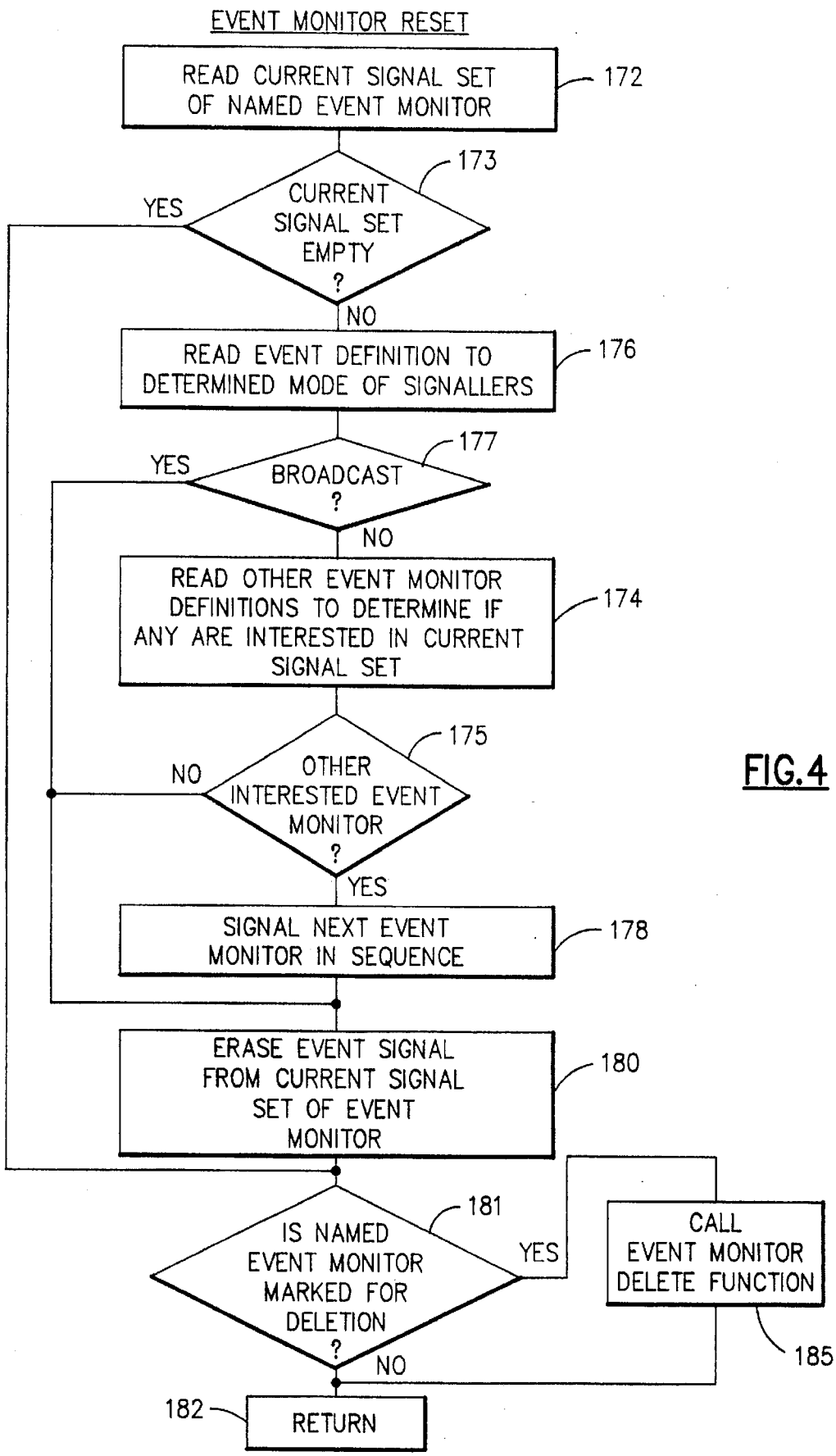
FIG. 4 is a flowchart illustrating an EventMonitorReset function of the operating system of FIG. 1.

In step 172 of FIG. 4, the EventMonitorReset function reads the current signal set to identify any remaining signals. The current signal set will be full if decision block 1124 led directly to step 1126, but will be partially or completely empty if the event handler called the EventDiscard function in step 1125. If the current signal set is not empty (decision block 173), the EventMonitorReset function reads the event definition for each event signal in the current signal set to determine the mode of signalling of other interested event monitors (step 176). For each event signal, if the mode of signalling is the broadcast mode (decision block 177), then the EventMonitorReset function proceeds to step 180 to erase the event signal from the current signal set of the event monitor named in the EventMonitorReset call (because the other interested event monitors already received the event signal). However, if the event definition indicates the FIFO or LIFO propagation mode for any of the event signals, then decision block 177 leads to step 174 in which the EventMonitorReset function reads the other event monitor definitions to determine if any are interested in that event signal (step 174). If so (decision block 175), then the EventMonitorReset function signals the next event monitor in the sequence for the respective event signal, and then proceeds to step 180. Thus, the event signals remaining in the current signal set for the events which are defined for the propagation mode are propagated to the next event monitor in the sequence for each event. That event monitor also executes the sequence of steps 115–119 illustrated in FIG. 2, and the respective event handler executes steps 1120–1126. After step 180, the EventMonitorReset function determines if the event monitor 28a has been marked for deletion as described below (decision block 181). If so, the EventMonitorReset function calls an EventMonitorDelete function 68 (step 185) described below. If not, or after receiving the return from the EventMonitorDelete function, the EventMonitorReset function returns to its caller (step 182).

Figure 5:
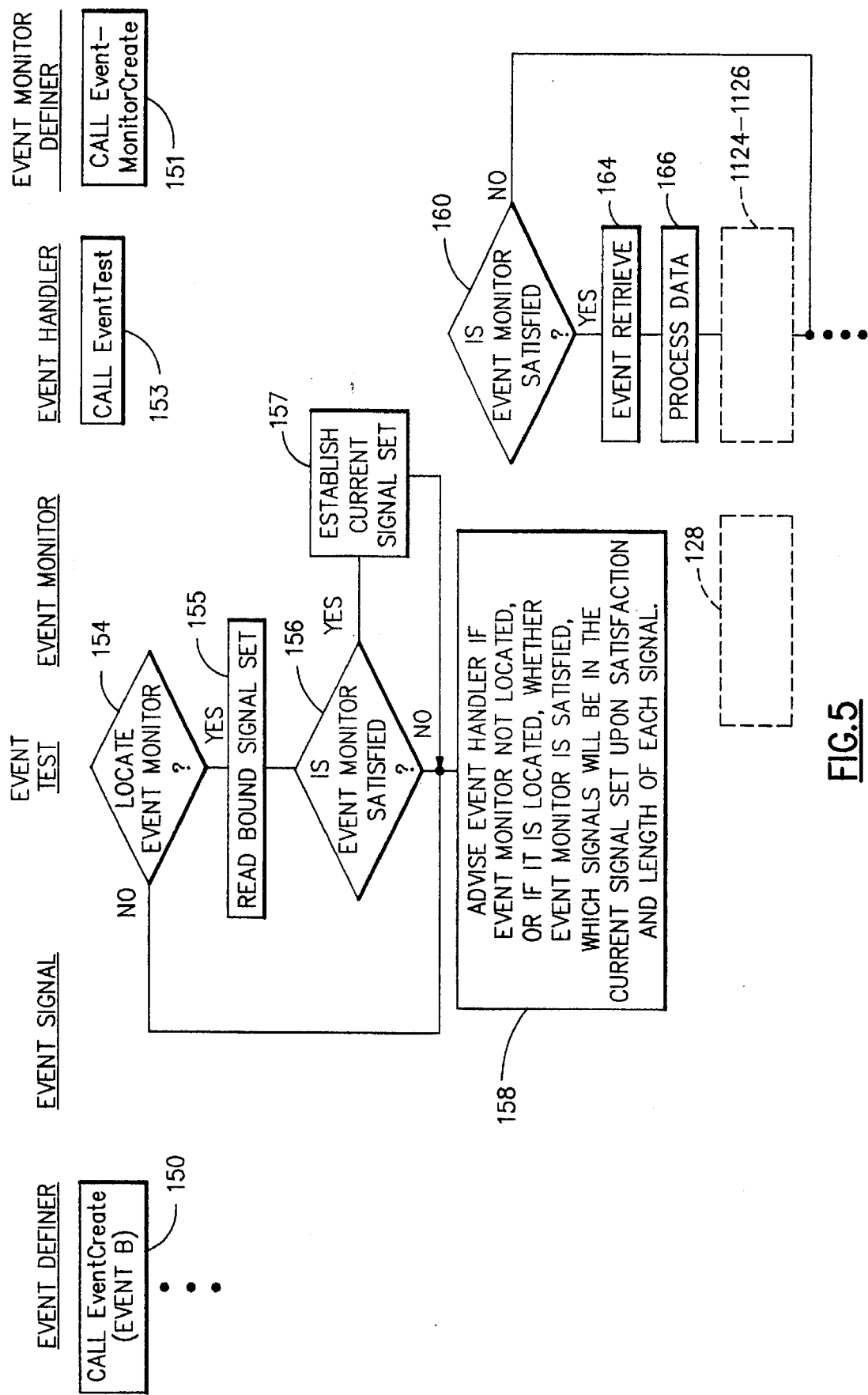
FIG. 5 is a flowchart illustrating operation of the operating system of FIG. 1 when an event occurs and an interested application program thread, while in a test mode, is notified of the event.

FIG. 5 is a flowchart illustrating operation of the operating system 11 when event handler 14c calls the EventTest function. In step 150, either the event definer 12b or 13b defines Event B. Concurrently or at a later time, event monitor definer 17b defines an event monitor 28b which is interested in Event B (step 151). Next, event handler 14b calls the EventTest function 50 requesting status information about event monitor 28b (step 153). In response, the EventTest function locates event monitor 28b (decision block 154), reads the bound signal set of event monitor 28b (step 155) and then determines if the event monitor is satisfied (decision block 156). If so, the EventTest function activates the event monitor and establishes the current signal set (step 157). After the event monitor returns to the Event Test function at step 158 or if the event monitor was not satisfied, the EventTest function advises the event handler 14b whether the event monitor is satisfied, which event signals will be in the current signal set upon satisfaction of the event monitor, and the length of each signal (step 158). If event monitor 28b is satisfied (decision block 160), then the event handler will call the EventRetrieve function to obtain the event data (step 164), process the data (step 166) and then execute steps 1124–1126 described above. However, if the event monitor was not satisfied, then the event handler avoids steps 164, 166 and 1124–1126, and can perform other work.

Figure 6A:
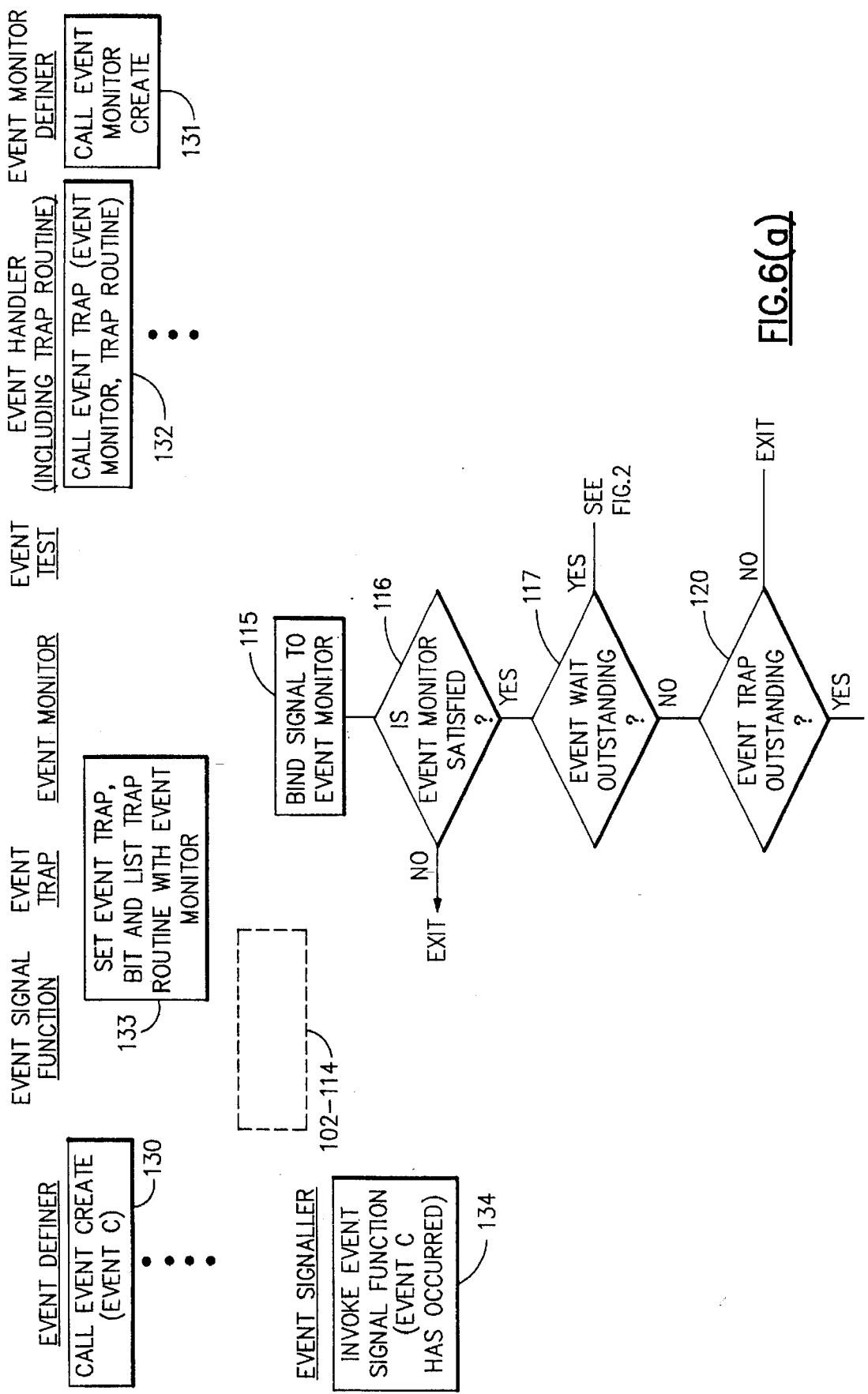
FIGS. 6(a–b) form a flowchart illustrating operation of the operating system of FIG. 1 when an event occurs and an interested application program thread, while in a trap mode, is notified of the event.

FIG. 6A, B form a flowchart illustrating operation of the operating system 11 when the EventTrap function 52 is called. In step 130, either event definer 12b within the operating system 11 or event definer 13b within any application program defines Event C. Concurrently, or at a later time, event monitor definer 17c defines an event monitor 28c which is interested in Event C (step 131). Next, event handler 14b calls the EventTrap function 52 specifying that event monitor 28c should notify a trap routine within the event handler 14c when the event monitor is satisfied, and the name or address of the trap routine (step 132). After step 132, the event handler 14b can perform other work; it does not idly wait for event notification in the event trap mode. In response to the call, the EventTrap function sets an event trap bit and lists the trap routine's name or address with the event monitor 28c (step 133). Subsequently, Event C occurs, and event signaller 18b or 15b calls the EventSignal function 49 (step 134). Then, the EventSignal function executes steps 102–114 as described above, and the event monitor executes step 115–117 as described above; however, step 117 indicates that the event wait bit has not been set. Therefore, the event monitor proceeds to determine that the event trap bit has been set (decision block 120), and then calls the trap routine within event handler 14c (step 122). The trap routine calls the EventTest function 50 illustrated in FIG. 5 specifying the event monitor, event name and event key (step 138). Then, the EventTest function executes steps 154–158 as described above. Based on the information received from the EventTest function, the trap routine determines that the event monitor has been located (decision block 139). Then, the trap routine calls the EventRetrieve function to retrieve the event data from the current signal set (step 140), processes the event data (step 142), and executes steps 1124–1126 as described above. If the trap routine returns without having reset the monitor, the event monitor calls the EventMonitorReset function when it receives the return from the event handler (step 128).

Figure 7:
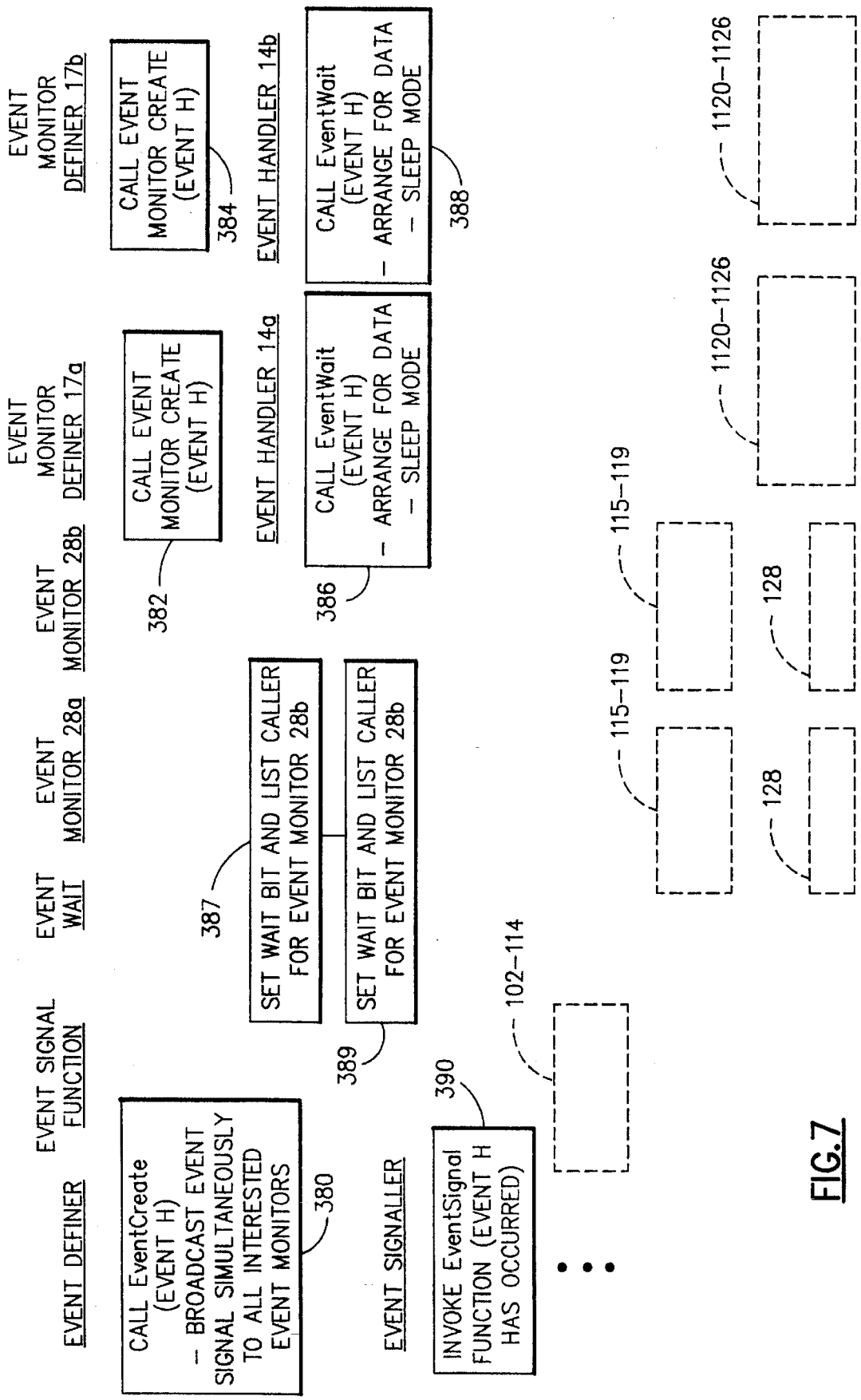
FIG. 7 is a flowchart illustrating a broadcast mode of signalling two event monitors which are interested in the same event.

FIG. 7 is a flowchart illustrating broadcast of an event signal to two interested event monitors. In step 380, an Event H is defined and the definition includes the name of the event and an indication that all interested event monitors should be notified in the broadcast mode, i.e. substantially simultaneously. Concurrently or at a later time, the event monitor definer 17a defines an event monitor 28a which is interested in Event H (step 382), and event monitor definer 17b defines an event monitor 28b which is also interested in Event H (step 384). The event handler 14a then calls the EventWait function and directs itself into a sleep mode awaiting notification of Event H (step 386). The EventWait function sets the wait bit for event monitor 28a and lists the caller for event monitor 28a (step 387). Similarly, the event handler 14b calls the EventWait function and directs itself into the sleep mode awaiting notification of Event H (step 388). The EventWait function sets the wait bit for event monitor 28b and lists the caller for event monitor 28b (step 389). Subsequently, Event H occurs, and the event signaller calls the EventSignal function 49 (step 390). In response, the EventSignal function executes steps 102–114 as described above, and in step 102 determines that the broadcast mode has been specified. In step 110, the EventSignal function learns that two event monitors 28a and 28b are both interested in the Event H. In step 114a, the EventSignal function signals both of the event monitors nearly at the same time; neither event monitor can prevent signalling to the other event monitor. After receiving the event signal, event monitor 28a executes steps 115–119, and the associated event handler 14a executes steps 1120–1126 as described above. Similarly, after receiving the event signal, event monitor 28b executes steps 115–119, and the associated event handler 14b executes steps 1120–1126 as described above. The respective event monitors 28a and 28b execute step 128. Therefore, after Event H occurs, both event handlers 14a and 14b receive the event notification and event data nearly simultaneously, and neither event handler can prevent the other event handler from receiving the event notification and event data.

Figure 8:
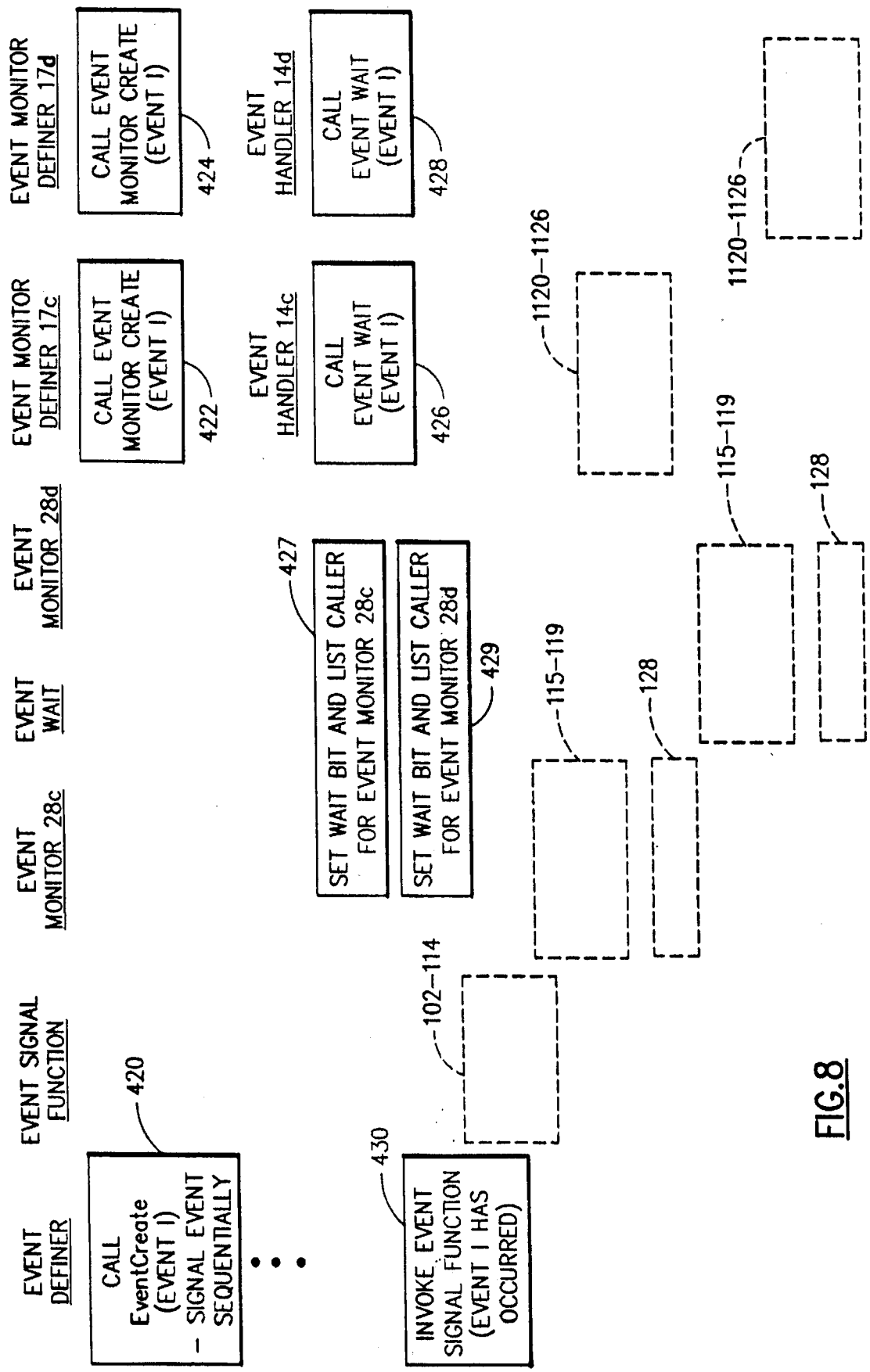
FIG. 8 is flowchart illustrating a propagation mode of signalling two event monitors which are interested in the same event.

FIG. 8 is a flowchart illustrating propagation of an event signal from a first event monitor to a second event monitor in a sequence, with the right of the first event monitor in the sequence to prevent propagation of the event signal to the second event monitor in the sequence. In step 420, Event I is defined, and the definition includes the FIFO propagation attribute which means that interested event monitors should be signalled sequentially in order of creation. Concurrently or at a later time, event monitor definer 17c defines event monitor 28c which is interested in Event I (step 422), and event monitor definer 17d defines event monitor 28d which is also interested in Event I (step 424). As illustrated in FIG. 9, when each event monitor is created, it is chained or referenced by address to the previously created event monitor which is interested in the same event. This indicates the order of creation. After the event monitors are defined, event handler 14c calls the EventWait function specifying event monitor 28c (step 426), the EventWait function sets the wait bit and lists the caller (step 429), event handler 14d calls the EventWait function specifying the event monitor 28d (step 428) and the EventWait function sets the wait bit and lists the caller (step 429). Subsequently, Event I occurs, and the event signaller calls the EventSignal function 49 (step 430). In response, the EventSignal function executes steps 102–114, and in step 102 notes from the event definition that the FIFO propagation mode has been specified. In step 110, the EventSignal function also learns that event monitors 28c and 28d are both interested in Event I, and from the order of chaining of the event monitors that event monitor 28c was created first. Then, in step 114b, the EventSignal function signals the first interested event monitor in the sequence, event monitor 28c. Then, event monitor 28c executes steps 115–119, and in step 119 awakens event handler 14c. Then, the event handler 14c executes steps 1120–1124 and 1126, and in decision block 1124 decides that the event signal should be available for propagation. Then, the event handler 14c returns to the event monitor in step 1126 which automatically calls the EventMonitorReset function (step 128). However, the event handler 14c could have decided in decision block 1124 that any or all of the event signals in the current signal set should not be available for propagation and then call the EventDiscard function 58 specifying which ones should be discarded. If in step 1125, event handler 14c specifies that all the event signals in the current signal set should be discarded (which in the illustrated example is the lone signal for Event I), then in step 186 of FIG. 3, they are discarded and the EventMonitorReset function would not propagate anything to event monitor 28d because the current signal set would be empty (decision block 173 of FIG. 4). In the illustrated example, however, event handler 14c does not discard the signal for Event I, event monitor 28c is reset, and the EventMonitorReset function signals the event monitor 28d in step 178 of FIG. 4 which executes steps 115–119. Then, event handler 14d executes steps 1120–1126. If event handler 14d discards Event I in step 1125, then when the EventMonitorReset function is called, decision block 173 of FIG. 4 would avoid an attempt at propagating the event signal because the current signal set would be empty. If event handler 14d does not discard Event I in step 1125, then when the EventMonitorReset function is called, decision block 175 would avoid an attempt at propagation because there are no more interested event monitors.

FIG. 10 illustrates a more complicated example of chaining of event monitors to indicate order of propagation. Event monitor 28e is interested in Events M, N and O, and was created first. Event monitor 28f was created after event monitor 28e, is interested in events M and P and is chained from the Event M reference in event monitor 28e to indicate that both event monitors are interested in Event M. Event monitor 28g was also created after event monitor 28e, is interested in the events N and O, and is chained from the event N and event O references in event monitor 28e to indicate that both event monitors are interested in Events N and O. Similarly, event monitors 28h and 28i were created after event monitor 28f, are interested in events M and P, respectively, and are chained from the respective event M and event P references in the event monitor 28f. Thus, when it is necessary to propagate each event signal from any of these event monitors, the EventMonitorReset function reads the event monitor definition to identify the next event monitor in the FIFO or LIFO sequence that is interested in the particular event.

At any time after defining an event, the process which defined the event can delete or modify the event definition by calling an EventDelete function 69 or an EventModify function 71. The EventDelete function is illustrated in FIG. 11. The EventDelete function does not affect current processing of the current signal set, but reads the bound signal set for each event monitor which is interested in the event to be deleted and the loose signal set 41 for the event to determine if there are any event signals which are not in the current signal set (decision block 296). If so, they are discarded (step 298). Next, the EventDelete function indicates in the definition of each event monitor which is interested in the event that the event has been deleted (step 300). Then, the EventDelete function determines if there are any event monitors which are interested in the event and have outstanding EventWaits (decision block 302). If so, the EventDelete function calls the event monitor at step 119 (step 303) and steps 120–128 are executed. In step 120, the event handler will learn that the event has been deleted and consequently that the event monitor associated with the event handler may never be satisfied. Next, the EventDelete function determines if there are any event monitors which are interested in the event and have outstanding event traps (decision block 304). If so, the EventDelete function calls the event monitor(s) at step 122 (step 305), and then steps 138–142 and 1124–1126 are executed. In step 158 of the EventTest function (which was called by the trap routine in step 138), the EventTest function notifies the trap routine that the event monitor may never be satisfied. Finally, the EventDelete function deletes the event definition (step 306).

The EventModify function is called to change the loose signal limit or operational status of signalling attributes within the event definition. Changes to the loose signal limit attribute take effect immediately whereas changes to the operational status attribute do not take effect until a subsequent signal is issued.

When an event is originally created, it is automatically enabled. The EventEnable function 44 can be called to disable an event after the event is created or to enable a disabled event. When an event is disabled, signals for the event are bound to the interested event monitor(s) but do not count toward satisfaction of the event monitor(s).

Figure 12:
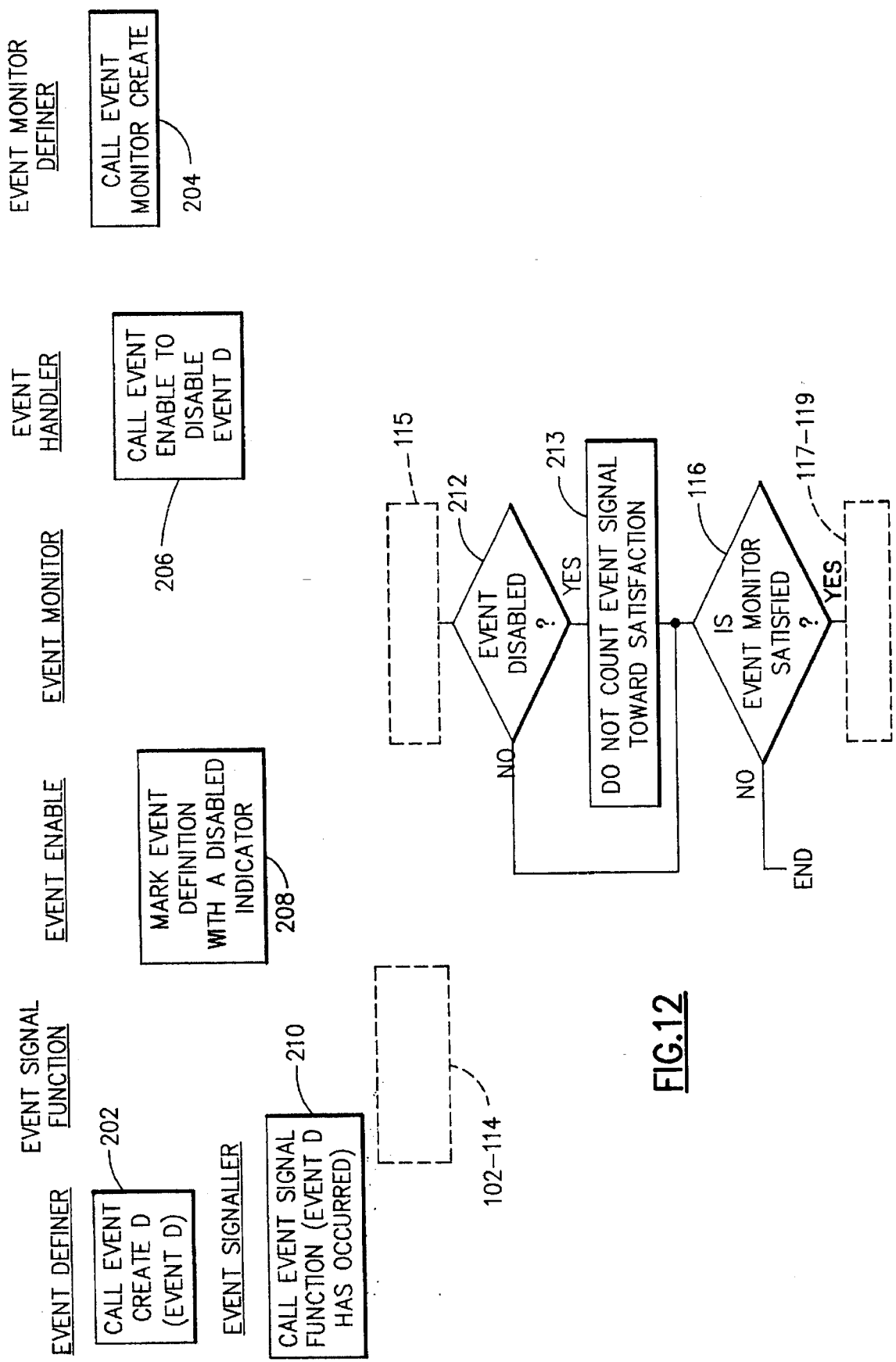
FIG. 12 is a flowchart illustrating an EventEnable function of the operating system of FIG. 1.

FIG. 12 is a flowchart illustrating the EventEnable function. In step 202, the event definer 13a defines Event D, and in step 204 the event monitor definer 17d defines event monitor 28d which is interested in Event D. Next, the event handler 14d which is associated with event monitor 28d can call the EventEnable function and specify that Event D should be disabled (step 206). In response, the EventEnable function marks the event definition for Event D as disabled (step 208). Subsequently, Event D occurs, the event signaller calls the EventSignal function (step 210), and the EventSignal function executes steps 102–114 as described above. Then, the event monitor binds the event signal to event monitor 28d but indicates that the event signal should not count toward satisfying the event monitor (decision block 212 and step 213). Then, the event monitor proceeds to step 116 and subsequent steps 117–119 as described above in FIG. 2, but in step 116 does not count the latest occurrence of Event D toward satisfaction of the event monitor.

As noted above, when an event monitor is originally created, it is automatically enabled. However, the EventMonitorEnable function 64 can be called to disable an event monitor after creation, or enable a disabled event monitor. Event signals will be bound to a disabled event monitor, but a disabled event monitor cannot be satisfied.

Figure 13:
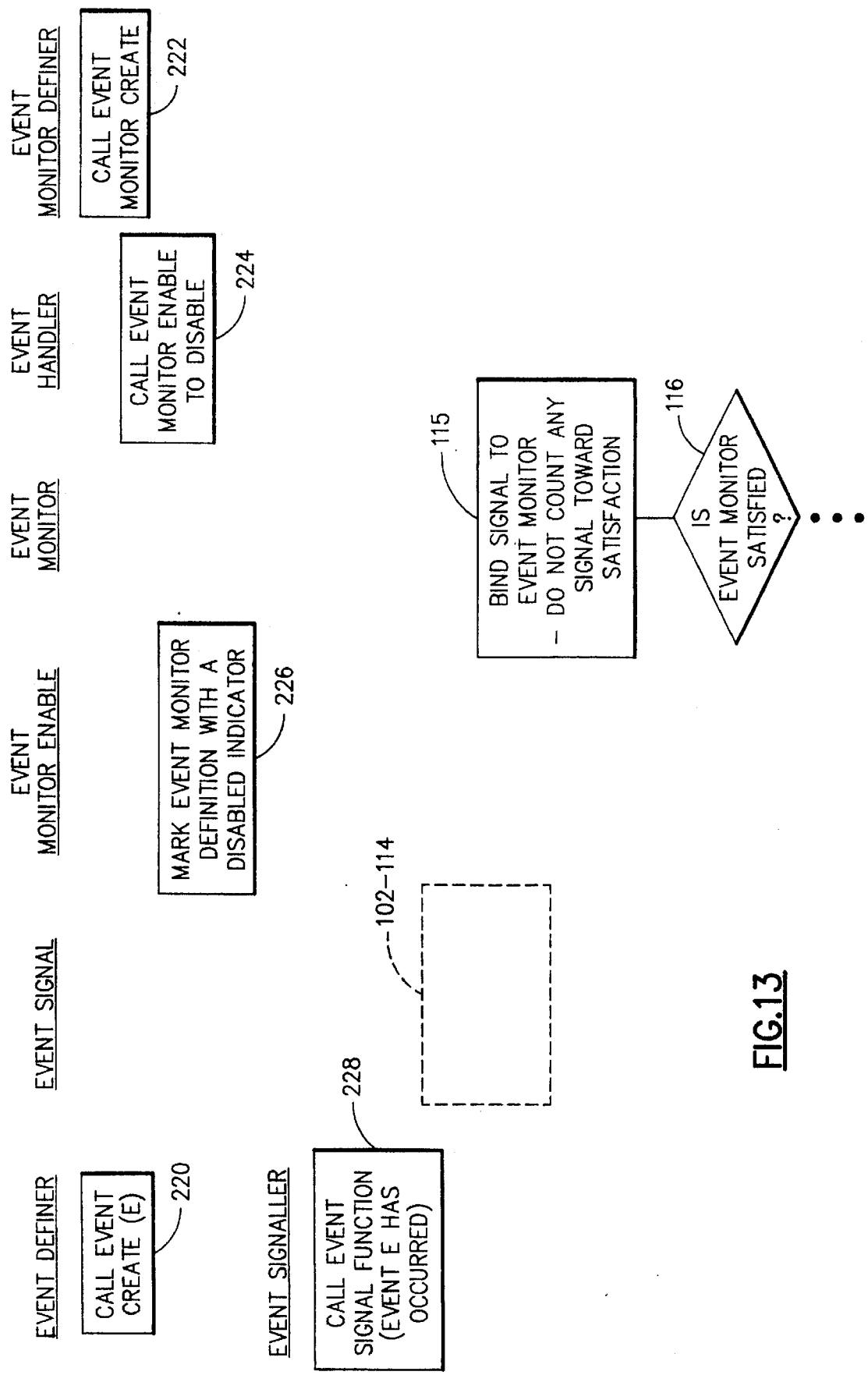
FIG. 13 is a flowchart illustrating an EventMonitorEnable function of the operating system of FIG. 1.

FIG. 13 is a flowchart illustrating the EventMonitorEnable function. After Event E is created (step 220), and an interested event monitor is created (step 222), the event handler can call the EventMonitorEnable function specifying that the named event monitor should be disabled (step 224). In response, the EventMonitorEnable function marks the EventMonitor definition with a disabled indicator (step 226). When Event E occurs, the event signaller calls the EventSignal function (step 228), and the EventSignal function executes steps 102–114 as described above. Then, the event monitor binds the event signal to the event monitor (step 115), but on account of the disabled indicator in the event monitor definition, the event monitor does not count this or any signal toward satisfaction of the event monitor in decision block 116, and no further action is taken by the event monitor.

When an event is originally defined, monitoring is automatically started. If the monitoring remains started, the EventSignal function signals the interested event monitor(s) in the manner described above in FIGS. 2, 5 and 6a, b. However, an EventSelect function 60 can be called to stop monitoring specific events, or to start monitoring after monitoring has been stopped. When monitoring is stopped, subsequent event signals are not bound to any event monitor in the process which issued the EventSelect function.

Figure 14:
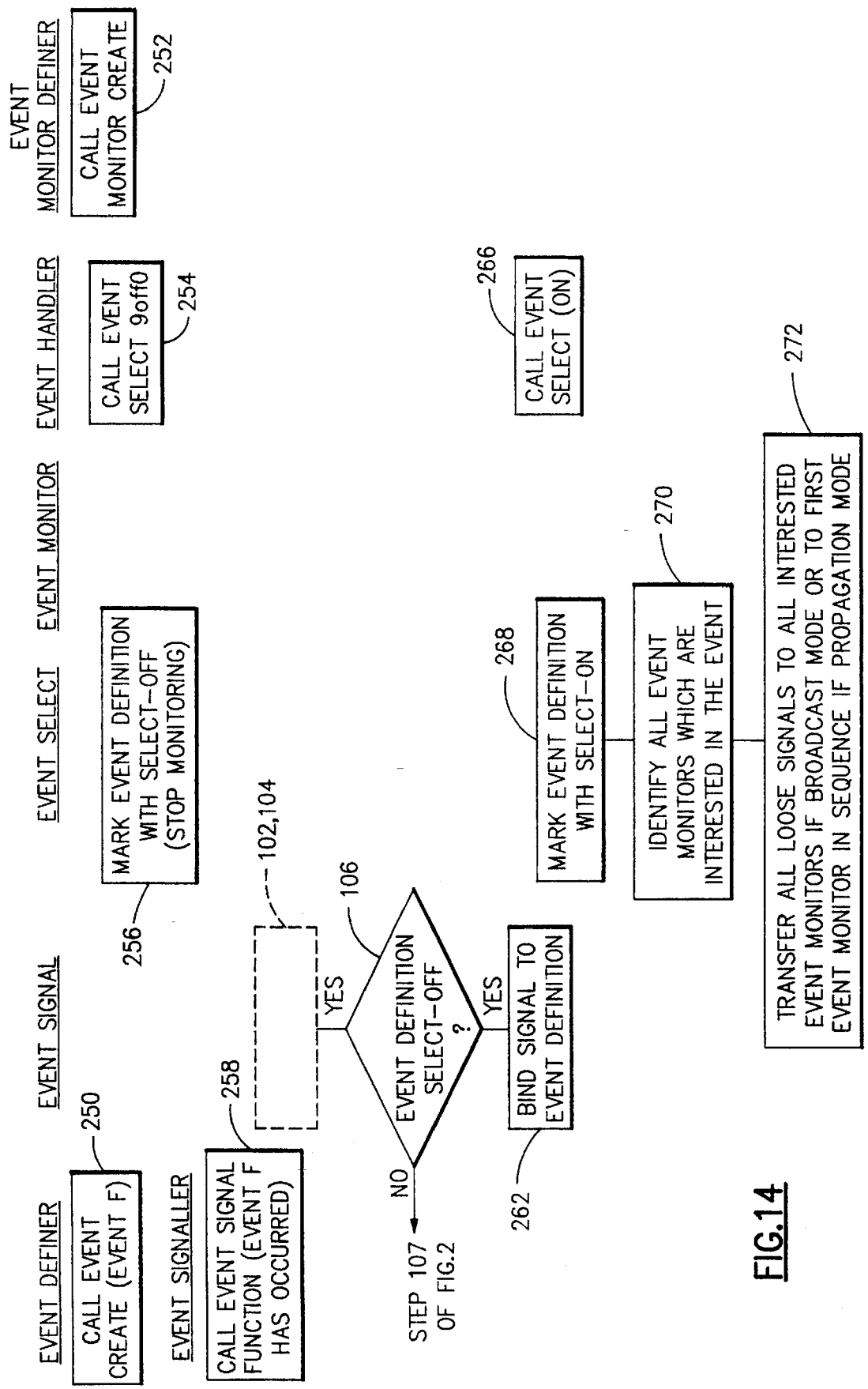
FIG. 14 is a flowchart illustrating an EventSelect function of the operating system of FIG. 1.

FIG. 14 illustrates the EventSelect function. In step 250, the Event F is defined and monitoring is automatically started. Then, the event monitor is defined (step 252). Subsequently, the event handler calls the EventSelect function and specifies that monitoring of a named event should be stopped (step 254). In response, the EventSelect function marks the event definition for the named event as monitoring stopped (step 256). Subsequently, Event F occurs, and the event signaller calls the EventSignal function (step 258). The EventSignal function executes steps 102 and 104 as described above, and then determines from the event definition that monitoring should be stopped (decision block 106). Consequently, the EventSignal function binds the event signal to the event definition in accordance with the loose signal limit within the event definition (step 262). Because monitoring has been stopped, the EventSelect function does not signal any event monitor, not even the interested event monitor.

When any event monitor is initially created, monitoring is automatically started for the event monitor. However, the EventMonitorSelect function 66 can be called to stop monitoring by an event monitor, or to start monitoring by a stopped event monitor. The EventMonitorSelect function 66 differs from the EventMonitorEnable function 64 because the signal of interest to a stopped event monitor is not bound to the event monitor, whereas the signal of interest to a disabled event monitor is bound to the event monitor.

Figure 15:
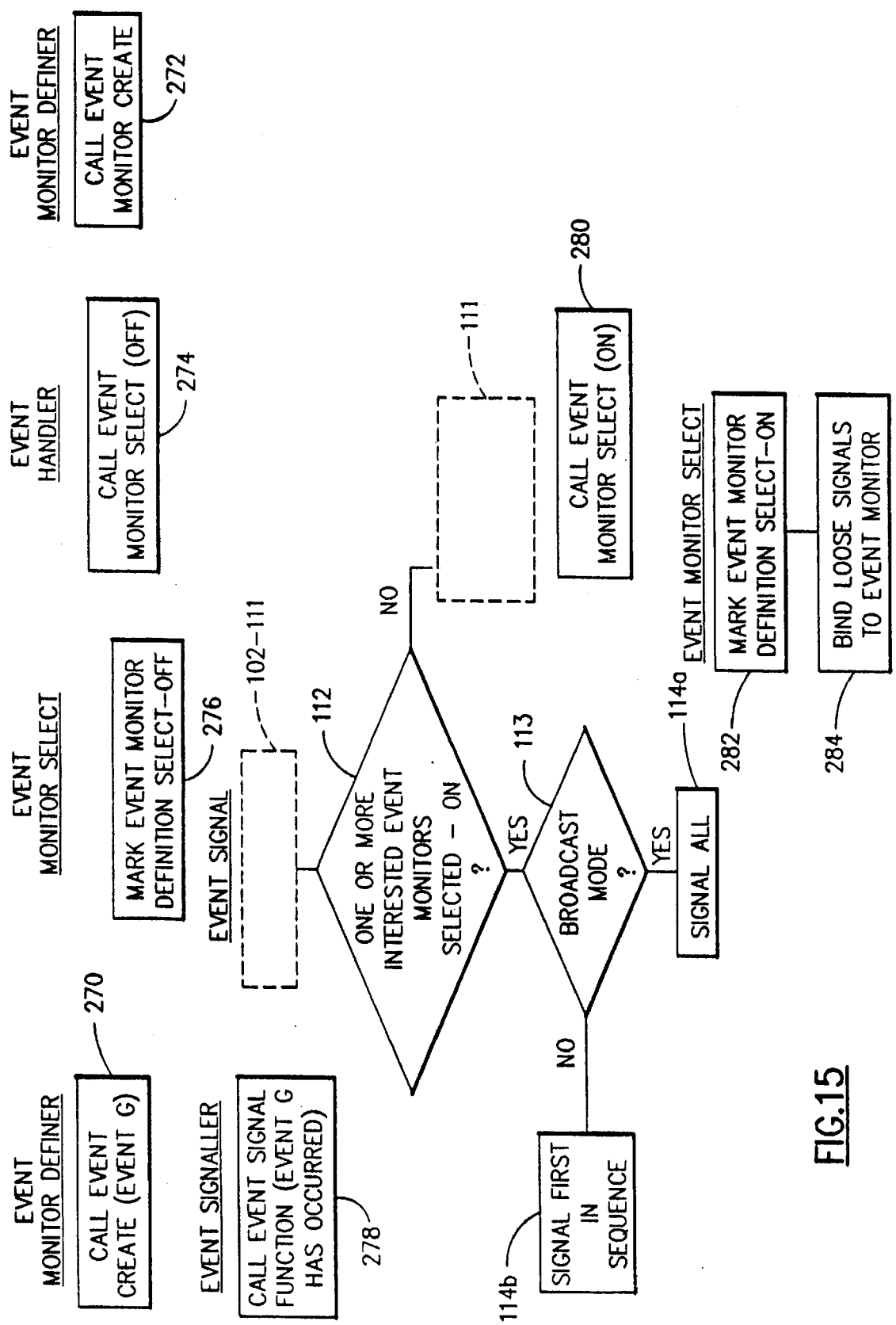
FIG. 15 is a flowchart illustrating an EventMonitorSelect function of the operating system of FIG. 1.

FIG. 15 is a flowchart illustrating the EventMonitorSelect function. In step 270, Event G is defined, and in step 272 an interested event monitor 28b is defined. In step 274, the event handler 14b calls the EventMonitorSelect function specifying that event monitor 28b should stop monitoring. In response, the EventMonitorSelect function marks the event monitor definition as monitoring stopped (step 276). After Event G occurs and the event signaller calls the EventSignal function (step 278), the EventSignal function executes steps 102–114 as described above and in decision block 112, determines that monitoring for event monitor 28b has been stopped. As a result, the EventSignal function binds the event signal to the event definition for Event G but does not signal event monitor 28b or bind the signal to event monitor 28b. It should be noted, that if there are other event monitors which are interested in Event G and have their monitoring started, then these other event monitors would receive the event signal in step 112, and the event signal would not be bound to the event definition.

Figure 16:
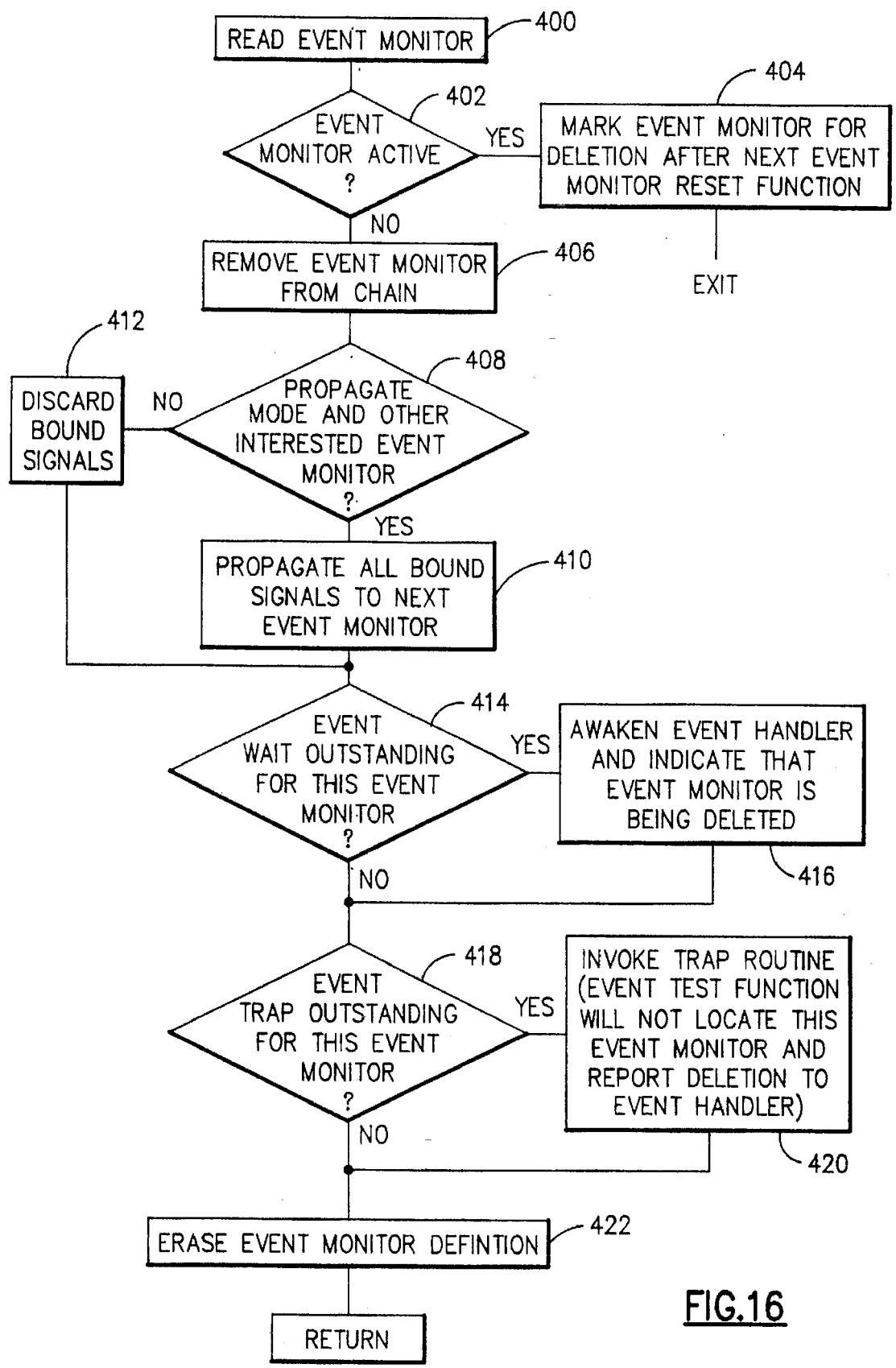
FIG. 16 is a flowchart illustrating an EventMonitorDelete function of the operating system of FIG. 1.

At any time after creation of an event monitor, the process that created the event monitor can also delete the event monitor by calling an EventMonitorDelete function 68 illustrated in FIG. 16. When a process is terminated, the process calls the EventMonitorDelete function to delete all of the event monitors that were defined by the process. In step 400, the EventMonitorDelete function reads the information (definition, bound signals, status, etc.) associated with the event monitor. If the event monitor is active (decision block 402), the EventMonitorDelete function marks the event monitor with an indication that the event monitor should be deleted when it is next reset (step 404), which causes the EventMonitorReset function to call the EventMonitorDelete function during step 185 of FIG. 4. However, the EventMonitorDelete function does not interfere with processing of the current signal set. If the event monitor was found to be inactive in decision block 402, or after the event monitor becomes inactive after processing of the current signal set and a subsequent execution of the EventMonitorReset function, the EventMonitorDelete function removes the event monitor from the chain so that it is no longer accessible to any other function (step 406). Next, the EventMonitorDelete function determines if any of the events in which the event monitor is interested are defined with the propagation attribute and if there are any other interested, downstream event monitors (decision block 408). If both conditions are satisfied, then the EventMonitorDelete function propagates each bound event signal that meets these conditions to the next event monitor in the respective sequence (step 410). The EventMonitorDelete function discards any bound signals that do not meet both criteria (step 412). Next, the EventMonitorDelete function reads the event wait bit in the event monitor to determine if there is an EventWait outstanding (decision block 414). If so, the EventMonitorDelete function awakens the respective event handler and indicates that the event monitor is being deleted (step 416). Next, the EventMonitorDelete function reads the trap bit to determine if there is an event trap outstanding (decision block 418). If so, the EventMonitorDelete function invokes the trap routine (step 420). When the trap routine invokes the EventTest function (step 138 of FIG. 6, the EventTest function will not locate the event monitor in decision block 139 of FIG. 6 and report to the trap routine that the event monitor does not exist. Then, the trap routine will return to the operating system, and the operating system implicitly calls the EventMonitorReset function. Finally, the EventMonitorDelete function erases the event monitor definition (step 422).

In an alternate embodiment of the present invention, any of the attributes of an existing event monitor, including the events of interest to the event monitor, can be dynamically modified. If an event type is deleted from a list of events of interest to the event monitor, then bound signals of the deleted event type are processed as described in the EventMonitorDelete function 68. If an event type is added to the event monitor definition, then any loose signals of that event type are processed as described in the EventMonitorCreate function 42. In fact, the event monitor modification is functionally equivalent to atomically deleting the event monitor with the EventMonitorDelete function 68 and recreating the event monitor with the EventMonitorCreate function 42 with the following exceptions. Bound signals of events that are of interest to the event monitor both before and after the modification are neither discarded nor propagated except if the bound signal limit is decreased and there are more bound signals than the decreased limit, in which case the excess oldest bound signals are discarded. Also, because the event monitor definition is modified atomically (i.e. in one step), there is no possibility of losing signals for events that occur while the event monitor definition is being modified.

EVENT SIGNAL MANAGER FUNCTION CALLS

| EventCreate | retcode |
|---|---|
| | rsncode |
| | event_name |
| | event_name_length |
| | event_flag |
| | event_flag_size |
| | loose_signal_limit |
| | signal_timeout_period |

Parameters:

"EventCreate" is the name of the function being invoked. "Retcode" is a signed 4-byte binary variable to hold the return code from EventCreate. A "return code" indicates success or failure or error or lack of error of a call or parameter.

"Rsncode" is a signed 4-byte binary variable to hold the reason code from EventCreate. A "reason code" indicates the reason for a failure or error of a call or parameter.

"Event name" is a character variable containing the name of the event to be defined. "Event_name_length" is a signed 4-byte binary variable containing the length of event_name.

"Event flag" is an array of 4-byte binary variables each element of which contains information about how the event is to be managed. Only one option from each of the following sets may be specified. If no option from a particular set is specified, the default is taken. The scope of the event name is indicated by process and session;

"vm_evn_process_scope" where only this process can monitor this event and only this process can signal this event, and "vm_evn_session_scope" where all processes in the session can both monitor and signal this event. The manner in which an event signal is delivered to multiple event monitors in a process is indicated as broadcast, FIFO or LIFO mode;

"vm_evn_broadcast_signals" where the signal is delivered simultaneously to all qualifying monitors, "vm_evn_fifo_signals" where the signal is delivered to one qualifying monitor at a time, in the order the monitors were created, and "_vm_evn_lifo_signals" where the signal is delivered to one qualifying monitor at a time, in the order opposite that of event defined with the FIFO option.

The treatment of the signaler is indicated as "vm_evn_async_signals", "vm_evn_sync_thread_signals", or "vm_evn_sync_process_signals". The vm_evn_async_signals indicates that the signaling thread is allowed to continue executing (the default). The vm_evn_sync_thread_signals indicates that the signaling thread is suspended until signal processing is complete. Signal processing in a process is considered complete when all qualifying monitors have completed processing of the signal or, if there are no qualifying monitors, the signal has been discarded as a result of being the oldest loose signal when the loose signal limit was exceeded. An event monitor is considered to have completed processing a signal when that signal has become part of the current signal set of the event monitor and that event monitor has subsequently been reset. For FIFO and LIFO events, a bound signal may be explicitly discarded via EventDiscard or implicitly discarded if it is the oldest bound signal when the bound signal limit of the event name-event key pair to which it is bound is exceeded. In either case, the processing of the discarded signal by that process is considered complete. If this is a session level event, all processes must have completed processing before signal processing is considered complete. The vm_evn_sync_process_signals indicate that all threads currently existing in the signaling process, with the exception of those threads running as the result of an event monitor activated by this signal, are suspended to await the outcome of event processing. Threads running as the result of event monitor activation may create additional threads which are not initially suspended. Upon EventMonitorReset however, the additional threads are treated as any other thread.

"Event_flag_size" is a signed 4-byte binary variable containing the number of elements in the event_flag array.

"Loose_signal_limit" is a signed 4-byte binary variable containing the number of event signals that may be retained if no eligible event monitor exists to which to bind the signal at the time the event is signaled. When the limit is exceeded, the oldest loose signal is discarded to make room for the newest arrival. A value of 0 indicates that no loose signals are to be retained. A value of −1 means that the loose signal list is allowed to grow without limit, subject to the availability of virtual storage. Any other negative value is considered an error.

"Signal_timeout_period" is a signed 4-byte binary variable representing the maximum length of time, specified in microseconds, that a signaling thread should remain suspended awaiting the completion of processing of the signal. A value of 0 indicates that the signaling thread should wait indefinitely for the completion of signal processing. If the option specifying that the signalling thread is to continue processing is included in the event_flag array, then this parameter is ignored.

| Event Delete | retcode |
|---|---|
| | rsncode |
| | event_name |
| | event_name_length |

Parameters:

"EventDelete" is the name of the function being invoked.

"Retcode" is a signed 4-byte binary variable to hold the return code from EventDelete.

"Rsncode" is a signed 4-byte binary variable to hold the reason code from the EventDelete.

"Event_name" is a character variable containing the name of the event whose definition is to be deleted.

"Event_name_length" is a signed 4-byte binary variable containing the length of event_name.

| | | |
|---|---|---|
| EventDiscard | retcode, rsncode, monitor_token, index | |

Parameters:

"EventDiscard" is the name of the function being invoked.

"Retcode" is a signed 4-byte binary variable to hold the return code from EventDiscard.

"Rsncode" is a signed 4-byte binary variable to hold the reason code from EventDiscard.

"Monitor token" is a signed 4-byte binary variable containing the token which identifies the event monitor from whose current signal set a signal is to be discarded. A value of 0 may be used to identify the active event monitor which was most recently activated on the current thread.

"Index" is a signed 4-byte binary variable identifying, as an index into the event_name_address, event_name_length, event_key_address, and event_key_length arrays specified in the creation of the event monitor, the event_name and event_key pair corresponding to the signal to be discarded. A value of 0 may be used to indicate that all signals in the current signal set are to be discarded.

| | |
|---|---|
| EventEnable | retcode rsncode number_of_events event_name_address event_name_length event_enablement_mask |

Parameters:

"EventEnable" is the name of the function being invoked.

"Retcode" is a signed 4-byte binary variable to hold the return code for EventEnable.

"Rsncode" is a signed 4-byte binary variable to hold the reason code from EventEnable.

"Number_of_events" is a signed 4-byte binary variable containing the number of event_name and event_key pairs of interest.

"Event_name_address" is an array of number_of_events 4-byte pointer variables each element of which contains the address of the name of an event whose occurrence is to be monitored.

"Event_name_length" is an array of number_of_events signed 4-byte binary variables each element of which contains the length of the event_name pointed to by the corresponding element of the event_name_address array.

"Event_enablement_mask" is an array of number_of_events signed 4-byte binary variables each element of which contains the enablement mask of the event_name pointed to by the corresponding element of the event_name_address array. The event enablement mask is maintained on a process basis; the EventEnable command affects the issuing process only. The value of the enablement mask determines the action to be performed, i.e.

"vm_evn_disable" which disables the event_name indicated by the corresponding element of the event_name_address array, or "vm_evn_enable" which enables the event_name indicated by the corresponding element of the event_name_address array.

| | |
|---|---|
| EventModify | retcode rsncode event_name event_name_length event_flag event_flag_size loose_signal_limit signal_timeout_period |

Parameters:

"EventModify" is the name of the function being invoked.

"Retcode" is a signed 4-byte binary variable to hold the return code from EventModify.

"Rsncode" is a signed 4-byte binary variable to hold the reason code from EventModify.

"Event_name" is a character variable which contains the name of the event whose definition is to be modified.

"Event_name_length" is a signed 4-byte binary variable containing the length of event_name.

"Event_flag" is an array of 4-byte binary variables each element of which contains information about how the event is to be managed. Only one option from the following set may be specified. If no option from this set is specified, the existing value of the option remains unmodified. The treatment of the signaler is indicated by vm_evn_async_ signals in which the signaling thread is allowed to continue executing (the default), vm_evn_sync_thread_signals in which the signaling thread is suspended to await the outcome of event processing, or vm_evn_sync_process_ signals in which all threads in the signaling process, with the exception of those threads running as the result of a monitor activated by this signal, are suspended to await the outcome of event processing.

"Event_flag_size" is a signed 4-byte binary variable containing the number of elements in the event_flag_array.

"Loose_signal_limit" is a signed 4-byte binary variable containing the number of event signals which may be retained if no eligible event monitor exists to which to bind the signal at the time the event is signaled. When the limit is exceeded, the oldest loose signal is discarded to make room for the newest arrival. A value of 0 indicates that no loose signals are to be retained. A value of −1 means that the loose signal limit will be allowed to grow without limit, subject to the availability of virtual storage. A value of −2 means that the existing loose_signal_limit is to remain unmodified. Any other negative value is considered an error.

"Signal_timeout_period" is a signed 4-byte binary variable representing the maximum length of time, specified in microseconds, that a signaling thread should remain suspended awaiting the completion of processing of the signal. A value of 0 indicates that the signaling thread should wait indefinitely for the completion of signal processing. A value of −1 means that the existing signal_timeout_period is to remain unmodified. If the option specifying suspension of the signaler is not included in the event_flag array, then this parameter is ignored.

| | |
|---|---|
| EventMonitorCreate | retcode rsncode monitor_token monitor_flag monitor_flag_size number_of_events event_name_address event_name_length event_key_address |

```
                    event_key_length
                    bound_signal_limit
                    event_count
```

Parameters:

"EventMonitorCreate" is the name of the function being invoked.

"Retcode" is a signed 4-byte binary variable to hold the return code from EventMonitorCreate.

"Rsncode" is a signed 4-byte binary variable to hold the reason code from EventMonitorCreate.

"Monitor_token" is a signed 4-byte binary variable in which is returned a token with which to identify the event monitor on subsequent invocations of other event management functions.

"Monitor_flag" is an array of signed 4-byte binary variables each element of which contains information about how the event monitor is to be managed. Only one option from each of the following sets may be specified. If no option from a particular set is given, the default is applied.

The longevity of the monitor is indicated by "vm_evn_no_auto_delete" which means that the event monitor persists until explicit EventMonitorDelete (the default), or "vm_evn_auto_delete" which means that the event monitor is automatically deleted at first deactivation or EventMonitorReset. The effect of monitor activation on dispatchability is indicated by "vm_evn_async_monitor" which means that all threads in the process containing the monitor remain dispatchable (the default), or "vm_evn_sync_process_monitor" which means that all threads currently existing in the process containing the monitor, except the one on which the monitor is being activated (i.e. the event handler for this event monitor), are suspended until the monitor is deactivated. The binding of loose signals to this monitor is indicated by "vm_evn_bind_loose_signals" (the default) which means that when the monitor is created, or monitoring is restarted via EventSelect or EventMonitorSelect, any loose signals for which this monitor is qualified are bound to this monitor, or "vm_evn_ignore_loose_signals" which means that no loose signals are bound to this monitor.

"Monitor_flag_size" is a signed 4-byte binary variable containing the number of elements in the monitor_flag array.

"Number_of_events" is a signed 4-byte binary variable containing the number of event_name and event_key pairs of interest.

"Event_name_address" is an array of number_of_events 4-byte pointer variables each element of which contains the address of the name of an event whose occurrence is to be monitored.

"Event_name_length" is an array of number_of_events signed 4-byte binary variables each element of which contains the length of the event_name pointed to by the corresponding element of the event_name_address array.

"Event_key_address" is an array of number_of_events 4-byte pointer variables each element of which contains the address of a key that further characterizes the particular instance of the event_name pointed to by the corresponding entry of the event_name_address array that is to be monitored. The key may be chosen to match exactly the key that will be carried by the signals of interest; or a partial key, possibly including wildcard characters, may be used to match a broader range of occurrences. "Event_key_length" is an array of number_of_events signed 4-byte binary variables each element of which contains the length of the event_key pointed to by the corresponding element of the event_key_address array. The key may be null (that is, its length may be 0) if no secondary characterization of the event is required to define the occurrence of interest; a null key in a monitor matches any key on a signal.

"Bound_signal_limit" is an array of number_of_events signed 4-byte binary variables each element of which contains the number of signals of the corresponding event name and event key pair that may be retained bound to the event monitor but unprocessed during an interval when the monitor is already active or testable or while the monitored condition remains unsatisfied. When the limit is exceeded, the oldest bound signal of a particular event_name and event_key pair is discarded to make room for the newest arrival. The minimum permissible value is 1, indicating that only the most recent instance of each signal is to be retained. A value of −1 means that the bound signal list is to be allowed to grow without limit, subject to the availability of virtual storage. Any other negative value, or 0, is considered an error.

"Event_count" is a signed 4-byte binary variable that contains the number of the specified event_name and event_key pairs for which signals must be bound to the monitor for the monitored condition to be considered satisfied. The value must fall between 1 and number_of_events. Alternately, in another embodiment of the present invention, an event_count is specified for each event type to indicate the number of occurrences of each event type required to satisfy the event monitor.

| EventMonitorDelete | retcode |
|---|---|
|  | rsncode |
|  | monitor_token |

Parameters:

"EventMonitorDelete" is the name of the function being invoked.

"Retcode" is a signed 4-byte binary variable to hold the return code from EventMonitorDelete.

"Rsncode" is a signed 4-byte binary variable to hold the reason code from EventMonitorDelete.

"Monitor_token" is a signed 4-byte binary variable containing the token which identifies the event monitor to be deleted. A value of 0 may be used to identify the active event monitor which was most recently activated on the current thread.

| EventMonitorEnable | retcode |
|---|---|
|  | rsncode |
|  | number_of_monitors |
|  | monitor_tokens |
|  | monitor_enablement_masks |

Parameters:

"EventMonitorEnable" is the name of the function being invoked.

"Retcode" is a signed 4-byte binary variable to hold the return code from EventMonitorEnable.

"Rsncode" is a signed 4-byte binary variable to hold the reason code from EventMonitorEnable.

"Number_of_monitors" is a signed 4-byte binary variable containing the number of monitor_tokens of interest.

"Monitor_tokens" is an array of number_of_monitors 4-byte pointer variables each element of which contains the token of the monitor which is to be enabled or disabled. A value of 0 may be used to identify the active event monitor which was most recently activated on the current thread.

"Monitor_enablement_masks" is an array of number_of_monitors signed 4-byte binary variables each element of which contains the enablement mask for the monitor identified by the corresponding element of the monitor_tokens array. The value of the enablement mask determines the action to be performed; i.e. "vm_evn_disable" causes the disabling of the monitor identified by the corresponding element of the monitor_tokens array, and "vm_evn_enable" causes the enabling of the monitor identified by the corresponding element of the monitor_tokens array.

EventMonitorQuery—An application program can call this function to obtain information about the definition and status of a previously created event monitor.

```
EventMonitorQuery       retcode
                        rsncode
                        monitor_token
                        monitor_flag
                        monitor_flag_size
                        monitor_flag_count
                        number_of_events
                        event_name_buffer_address
                        event_name_buffer_length
                        event_name_length
                        event_key_buffer_address
                        event_key_buffer_length
                        event_key_length
                        bound_signal_limit
                        bound_signal_count
                        monitor_selection_mask
                        monitor_enablement_mask
                        event_count
                        present_event_count
                        trap_routine_address
                        trap_routine_name
```

Parameters:

"EventMonitorQuery" is the name of the function being invoked.

"Retcode" is a signed 4-byte binary variable to hold the return code from EventMonitorQuery.

"Rsncode" is a signed 4-byte binary variable to hold the reason code from EventMonitorQuery.

"Monitor_token" is a signed 4-byte binary variable identifying the event monitor about which information is to be returned. A value of 0 may be used to identify the active event monitor which was most recently activated on the current thread.

"Monitor_flag" is an array of signed 4-byte binary variables in each element of which is returned information about how the event monitor is to be managed. Exactly one option from each of the following sets is included.

The longevity of the monitor is indicated either by "vm_evn_no_auto_delete" which means that the event monitor persists until explicit EventMonitorDelete or termination of the defining process, or "vm_evn_auto_delete" which means that the event monitor is automatically deleted at first deactivation or EventMonitorReset call.

The effect of monitor activation on dispatchability is indicated by "vm_evn_async_monitor" which means that all threads in the process containing the monitor remain dispatchable (the default), or "vm_evn_sync_process_monitor" which means that all threads currently existing in the process containing the monitor, except the one on which the monitor is being activated (i.e. the event handler for this event monitor), are suspended until the monitor is deactivated.

The binding of loose signals to this monitor is indicated either by "vm_evn_bind_loose_signals" which means that any qualifying loose signals that exist at the time the monitor is created or selected-on are bound to the event monitor (the default), or "vm_evn_ignore_loose_signals" which means that no loose signals are bound to the monitor.

The current activation state of the monitor is indicated by "vm_evn_monitor_active" which means that the monitored condition is satisfied and a signal processing program is executing; "vm_evn_monitor_waiting" which means that the monitor is not active, the monitored condition is not satisfied and there is an outstanding EventWait associated with the monitor; "vm_evn_monitor_trapping" which means that the monitor is neither active nor waiting, the monitored condition is not satisfied, and there is a trap routine associated with the monitor; or "vm_evn_monitor_testable" which means that the monitor is not active, waiting or trapping, the monitored condition may or may not be satisfied, and there is neither an outstanding EventWait or trap routine associated with the monitor.

"Monitor_flag_size" is a signed 4-byte binary variable containing the number of elements in the monitor_flag array.

"Monitor_flag_count" is a signed 4-byte binary variable in which is returned the number of elements in the monitor_flag array which have been set by EventMonitorQuery.

"Number_of_events" is a signed 4-byte binary variable containing the number of event_name and event_key pairs of interest.

"Event_name_buffer_address" is an array of number_of_events 4-byte pointer variables each element of which contains the address of a character variable in which is to be returned the name of an event whose occurrence is to be monitored.

"Event_name_buffer_length" is an array of number_of_events signed 4-byte binary variables each element of which contains the length of the event_name_buffer pointed to by the corresponding element of the event_name_buffer_address array.

"Event_name_length" is an array of number_of_events signed 4-byte binary variables in each element of which is returned the actual length of the event_name which has been stored in the buffer pointed to by the corresponding element of the event_name_buffer_address array. If the name is longer than the buffer, it is truncated; if shorter, the excess space at the end of the buffer is unchanged.

"Event_key_buffer_address" is an array of number_of_events 4-byte pointer variables each element of which contains the address of a buffer in which to return the key that further characterizes the particular instance of the event_name pointed to by the corresponding entry of the event_name_buffer_array which is being monitored.

"Event_key_buffer_length" is an array of number_of_events signed 4-byte binary variables each element of which contains the length of the buffer pointed to by the corresponding element of the event_key_buffer_address array.

"Event_key_length" is an array of number_of_events signed 4-byte binary variables in each element of which is returned the actual length of the event_key which has been stored in the buffer pointed to by the corresponding element of the Event_key_buffer_address array. If the key is longer than the buffer, it is truncated; if shorter, the excess space at the end of the buffer is unchanged.

"Bound_signal_limit" is an array of number_of_events signed 4-byte binary variables in each element of which is returned the number of signals of the corresponding event name and event key pair which may be retained bound to the event monitor but unprocessed during an interval when the monitor is already active or testable or while the monitored condition remains unsatisfied. When the limit is exceeded the oldest bound signal of a particular event_name and event_key pair is discarded to make room for the newest arrival. The minimum permissible value is 1, indicating that only the most recent instance of each signal is to be retained. A value of −1 means that the bound signal list is allowed to grow without limit, subject to the availability of virtual storage.

"Bound_signal_count" is an array of number_of_events signed 4-byte binary variables in each element of which is returned the number of signals of the corresponding event name and event key pair which are currently bound to the event monitor but unprocessed.

"Monitor_selection_mask" is a 4-byte variable in which is returned the selection mask for this monitor. This variable indicates whether this monitor is selected off or is selected on.

"Monitor_enablement_mask" is a 4-byte binary variable in which is returned the enablement mask for this monitor. This variable indicates whether this monitor is disabled or is enabled.

"Event_count" is a signed 4-byte binary variable in which is returned the number of the specified event_name and event_key pairs for which signals must be bound to the monitor for the monitored condition to be considered satisfied.

"Present_event_count" is a signed 4-byte binary variable in which is returned the number of the specified event_name and event_key pairs for which signals are currently bound to the event monitor.

"Trap_routine_address" is a 4-byte binary variable in which is returned the address of a routine to be invoked when the condition defined by the monitor is satisfied, as established by the EventTrap function. If no address has been established by EventTrap, a value of 0 is returned.

"Trap_routine_name" is an 8-byte variable in which is returned the name of a routine to be invoked when the condition defined by the monitor is satisfied, as established by the EventTrap function, or blank if no event trap is associated with the monitor.

| EventMonitorReset | retcode |
| --- | --- |
|  | rsncode |
|  | monitor_token |

Parameters:

"EventMonitorReset" is the name of the function being invoked.

"Retcode" is a signed 4-byte binary variable to hold the return code from EventMonitorReset.

"Rsncode" is a signed 4-byte binary variable to hold the reason code from EventMonitorReset.

"Monitor_token" is a signed 4-byte binary variable containing the token that identifies the monitor whose state is to be reset. A value of 0 may be used to identify the active event monitor most recently activated on the current thread.

| EventMonitorSelect | retcode |
| --- | --- |
|  | rsncode |
|  | number_of_monitors |
|  | monitor_tokens |
|  | monitor_selection_masks |

Parameters:

"EventMonitorSelect" is the name of the function being invoked.

"Retcode" is a signed 4-byte binary variable to hold the return code from EventMonitorSelect.

"Rsncode" is a signed 4-byte binary variable to hold the reason code from EventMonitorSelect.

"Number_of_monitors" is a signed 4-byte binary variable containing the number of monitor_tokens of interest.

"Monitor_tokens" is an array of number_of_monitors 4-byte binary variables each element of which contains the token of the monitor which is to be selected on or off. A value of 0 may be used to identify the active event monitor which was most recently activated on the current thread.

"Monitor_selection_masks" is an array of number_of_monitors signed 4-byte binary variables each element of which contains the selection mask for the monitor identified by the corresponding element of the monitor_tokens_array. The value of the selection mask determines the action to be performed, i.e. "vm_evn_select_off" means stop monitoring of the monitor identified by the corresponding element of the monitor_tokens array, and "vm_evn_select_on" means start monitoring of the monitor identified by the corresponding element of the monitor_tokens array.

EventQuery—An application program can call this function to obtain information about an existing event definition, including a list of all event monitors defined in the current process which are sensitive to occurrences of the event. The EventMonitorQuery function may be used to obtain further information about a particular event monitor.

| EventQuery | retcode |
| --- | --- |
|  | rsncode |
|  | event_name |
|  | event_name_length |
|  | event_flag |
|  | event_flag_size |
|  | event_flag_count |
|  | loose_signal_limit |
|  | signal_timeout_period |
|  | loose_signal_count |
|  | event_selection_mask |
|  | event_enablement_mask |
|  | monitor_token |
|  | monitor_token_size |
|  | monitor_token_count |

Parameters:

"EventQuery" is the name of the function being invoked.

"Retcode" is a signed 4-byte binary variable to hold the return code from EventQuery.

"Rsncode" is a signed 4-byte binary variable to hold the reason code from EventQuery.

"Event_name" is a character variable which contains the name of the event to be queried.

"Event_name_length" is a signed 4-byte binary variable containing the length of event_name.

"Event_flag" is an array of signed 4-byte binary variables in which is returned information about how the event is managed. Exactly one option from each of the following sets is included.

The scope of the event name is indicated either by "vm_evn_process_scope" which means the designated process, or "vm_evn_session_scope" which means the designated session.

The manner in which an event signal is propagated to multiple event monitors is indicated by "vm_evn_broadcast_signals" which means broadcast "vm_evn_fifo_signals" which means FIFO sequence, or "vm_evn_lifo_signals" which means LIFO sequence.

The treatment of the signaler is indicated by "vm_evn_async_signals" which means that the signaling thread is allowed to continue executing (the default), "vm_evn_sync_thread_signals" which means that the signaling thread is suspended to await the outcome of event processing, or "vm_evn_sync_process_signals" which means that all threads in the signaling process, with the exception of those threads running as the result of a monitor activated by this signal, are suspended to await the outcome of event processing.

"Event_flag_size" is a signed 4-byte binary variable containing the number of elements in the event_flag array.

"Event_flag_count" is a signed 4-byte binary variable in which is returned the number of elements in the event_flag array which have been set by EventQuery.

"Loose_signal_limit" is a signed 4-byte binary variable in which is returned the number of event signals which may be retained if no eligible event monitor exists to which to bind the signal or if a process is not monitoring for the event at the time the event is signaled. When the limit is exceeded, the oldest loose signal is discarded to make room for the newest arrival. A value of 0 indicates that no loose signals are retained. A value of negative one (−1) means that the loose signal set is allowed to grow without limit, subject to the availability of virtual storage.

"Signal_timeout_period" is a signed 4-byte binary variable in which is returned the maximum length of time, specified in microseconds, that a signaling thread is allowed to remain suspended awaiting the completion of processing of the signal. A value of 0 indicates that the signaling thread waits indefinitely for the completion of signal processing. If the option specifying that the signaling thread is to continue processing is included in the event_flag array, then this parameter is meaningless.

"Loose_signal_count" is a signed 4-byte binary variable in which is returned the number of loose signals currently being retained for the specific event.

"Event_selection_mask" is a signed 4-byte binary variable in which is returned the state of the event selection mask; i.e. "vm_evn_select_off" which means not monitoring for event_name, or "vm_evn_select_on" which means monitoring for event_name.

"Event_enablement_mask" is a signed 4-byte binary variable in which is returned the state of the event enablement mask; i.e. "vm_evn_disable" which means disabled for event name, or "vm_evn_enable" which means enabled for event_name. The event selection and enablement masks are maintained on a process basis and are reported for the issuing process only.

"Monitor_token" is an array of signed 4-byte binary variables in which is returned the list of tokens identifying the event monitors defined in the current process which are sensitive to the specified event. For events defined as sequential, the tokens are output in the order in which they will be processed. For events defined as broadcast, the tokens are output in the order in which the monitors were created.

"Monitor_token_size" is a signed 4-byte binary variable containing the number of elements in the monitor_token array which are available to be filled in.

"Monitor_token_count" is a signed 4-byte binary variable in which is returned the total number of event monitors defined in the current process which are sensitive to the specified event. If monitor_token_count is not greater than monitor_token_size, then the first monitor token count elements of the monitor_token array contain the tokens which identify that entire set of monitors and the remainder of the array is unchanged; otherwise, only the first monitor_token_size monitor tokens are returned.

EventQueryAll—An application program can call this function to obtain the names of all events and the tokens for all event monitors visible to this process. The EventQuery and EventMonitorQuery functions may be used to obtain further information about events and event monitors.

| EventQueryAll | retcode, |
| --- | --- |
| | rsncode, |
| | number_of_events |
| | event_name_address, |
| | event_name_length |
| | actual_name_length, |
| | monitor_token |
| | monitor_token_size |
| | monitor_token_count |

Parameters:

"EventQueryAll" is the name of the function being invoked.

"Retcode" is a signed 4-byte binary variable to hold the return code from EventQueryAll.

"Rsncode" is a signed 4-byte binary variable to hold the reason code form EventQueryAll.

"Number_of_events" is a signed 4-byte binary variable containing the number of elements in the following three arrays.

"Event_name_address" is an array of number_of_events 4-byte pointer variables each element of which contains the address of a character variable in which is to be returned the name of a defined event.

"Event_name_length" is an array of number_of_events signed 4-byte binary variables, each element of which contains the length of the buffer of the corresponding element of the event_name_address array. If the name is longer than the buffer, it is truncated; if shorter, the excess space at the end of the buffer is unchanged.

"Actual_name_length" is an array of number_of_events signed 4-byte binary variables. This function uses this array to output the lengths of the event names pointed to by the corresponding element of the event_name_address array.

"Monitor_token" is an array of signed 4-byte binary variables in which is returned the list of tokens identifying all the event monitors defined in the current process.

"Monitor_token_size" is a signed 4-byte binary variable containing the number of elements in the monitor_token array that are available to be filled in.

"Monitor_token_count" is a signed 4-byte binary variable in which is returned the total number of event monitors defined in the current process. If monitor_token_count is not greater than monitor_token_size, then the first monitor_token_count elements of the monitor_token array contain the tokens that identify that entire set of monitors and the remainder of the array is unchanged. Otherwise, only the first monitor_token_size monitor tokens are returned.

| EventRetrieve | retcode |
| --- | --- |
| | rsncode |
| | monitor_token |
| | index |
| | data_buffer |
| | data_buffer_length |
| | event_data_length |

Parameters:

"EventRetrieve" is the name of the function being invoked.

"Retcode" is a signed 4-byte binary variable to hold the return code from EventRetrieve.

"Rsncode" is a signed 4-byte binary variable to hold the reason code from EventRetrieve.

"Monitor_token" is a signed 4-byte binary variable containing the token which identifies the monitor from whose current signal set the retrieval is to be performed. A value of 0 may be used to identify the active event monitor which was most recently activated on the current thread.

"Index" is a signed 4-byte binary variable identifying, as an index into the event_name_address, event_name_length, event_key_address, and event_key_length arrays specified in the creation of the event monitor, the event_name and event_key pair corresponding to the signal from which the data is to be retrieved.

"Data_buffer" is a character variable in which is returned the signaled data for the event_name and event_key pair identified by index.

"Data_buffer_length" is a signed 4-byte binary variable containing the defined length of data_buffer.

"Event_data_length" is a signed 4-byte binary variable in which is returned the length of the signaled data for the event_name and event_key pair identified by index. If event_data_length is greater than data_buffer_length, the signaled data is truncated on the right and a warning return code is generated.

| EventSelect | retcode |
| --- | --- |
| | rsncode |
| | number_of_events |
| | event_name_address |
| | event_name_length |
| | event_selection_mask |

Parameters:

"EventSelect" is the name of the function being invoked.

"Retcode" is a signed 4-byte binary variable to hold the return code from EventSelect.

"Rsncode" is a signed 4-byte binary variable to hold the reason code from EventSelect.

"Number_of_events" is a signed 4-byte binary variable containing the number of events of interest.

"Event_name_address" is an array of number_of_events 4-byte pointer variables each element of which contains the address of the name of an event whose signals are to be selected on or off.

"Event_name_length" is an array of number_of_events signed 4-byte binary variables each element of which contains the length of the event_name pointed to by the corresponding element of the event_name_address array.

"Event_selection_mask" is an array of number_of_events signed 4-byte binary variables each element of which contains the selection mask of the event_name pointed to by the corresponding element of the event_name_address array. The value of the selection mask determines the action to be performed, i.e. "vm_evn_select_off" which means stop monitoring of the event_name pointed to by the corresponding element of the event_name_address array, or "vm_evn_select_on" which means start monitoring of the event_name pointed to by the corresponding element of the event_name_address array.

| EventSignal | retcode |
| --- | --- |
| | rsncode |
| | event_name |
| | event_name_length |
| | event_data |
| | event_data_length |

-continued

| | event_key_offset |
| --- | --- |
| | event_key_length |

Parameters:

"EventSignal" is the name of the function being invoked.

"Retcode" is a signed 4-byte binary variable to hold the return code from EventSignal.

"Rsncode" is a signed 4-byte binary variable to hold the reason code from EventSignal.

"Event_name" is a character variable which contains the name of the event whose occurrence is to be signaled.

"Event_name_length" is a signed 4-byte binary variable containing the length of event_name.

"Event data" is a character variable which contains data to be made available to any interested event monitors.

"Event_data_length" is a signed 4-byte binary variable key giving the length of event_data.

"Event_key_offset" is a signed 4-byte binary variable which contains the offset in event_data of the first byte of a key that characterizes the particular instance of the event to be signaled.

"Event_key_length" is a signed 4-byte binary variable which contains the length of the key contained in event_data. The key may be null (that is, its length may be 0) if no secondary characterization of the event is necessary for this type of event or for this occurrence of the event.

| EventTest | retcode |
| --- | --- |
| | rsncode |
| | monitor_token |
| | number_of_events |
| | event_flag |

Parameters:

"EventTest" is the name of the function being invoked.

"Retcode" is a signed 4-byte binary variable to hold the return code from EventTest.

"Rsncode" is a signed 4-byte binary variable to hold the reason code from EventTest.

"Monitor_token" is a signed 4-byte binary variable containing the token which identifies the monitor whose condition is to be tested. A value of 0 may be used to identify the active event monitor most recently activated on the current thread.

"Number_of_events" is a signed 4-byte binary variable containing the number of events whose occurrence is to be tested. In general, this should be the same as the number of event_name and event_key combinations specified in the definition of the event monitor.

"Event_flag" is an array of number_of_events signed 4-byte binary variables in each element of which is returned an indication of the occurrence or non-occurrence of the event identified by the event_name and event_key pair specified by the corresponding elements of the event_name_address, event_name_length, event_key_address, and event_key_length arrays used in defining the event monitor, i.e.

| 0, 1, 2, . . . | indicates that the event has been signaled, the number is the length of data provided on the signal that may be obtained with the EventRetrieve function. |
| --- | --- |
| −1 | indicates that the event has not been signaled, |

| | |
|---|---|
| −2 | indicates that the event definition has been deleted, and |
| −3 | indicates no corresponding event_name and event_key pair was defined in the event monitor. |
| Event Trap | retcode<br>rsncode<br>monitor_token<br>trap_routine_address<br>trap_routine_name |

Parameters:

"EventTrap" is the name of the function being invoked.

"Retcode" is a signed 4-byte binary variable to hold the return code from EventTrap.

"Rsncode" is a signed 4-byte binary variable to hold the reason code from EventTrap.

"Monitor_token" is a signed 4-byte binary variable containing the token that identifies the monitor whose condition is to be trapped. A value of 0 may be used to identify the active event monitor that was most recently activated on the current thread.

"Trap_routine_address" is a 4-byte binary variable containing the address of the routine to be invoked when the condition defined by the monitor is satisfied. If an address was previously associated with the event monitor, it is automatically replaced by the new trap_routine_address. If the address is a non-zero value, the trap_routine_name parameter is meaningless.

"Trap_routine_name" is a 8-byte character variable containing the name of the routine to be invoked when the condition defined by the monitor is satisfied. This parameter has meaning only if the trap_routine_address parameter is zero. If a name was previously associated with the event monitor, it is automatically replaced by the new trap_routine_name. If the trap_routine_address parameter is zero and the trap_routine_name is blank, the trap associated with the specified event monitor is cancelled.

| | |
|---|---|
| EventWait | retcode<br>rsncode<br>monitor_token<br>number_of_events<br>event_flag |

Parameters:

"EventWait" is the name of the function being invoked.

"Retcode" is a signed 4-byte binary variable to hold the return code from EventWait.

"Rsncode" is a signed 4-byte binary variable to hold the reason code from EventWait.

"Monitor_token" is a signed 4-byte binary variable containing the token which identifies the monitor whose condition is to be awaited. The monitor must not already be in the waiting state; there may be no more than one wait outstanding to a monitor at a time. A value of 0 may be used to identify the active event monitor which was most recently activated on the current thread.

"Number_of_events" is a signed 4-byte binary variable containing the number of events whose occurrence is to be indicated when the EventWait function completes. In general, this should be the same as the number of event_name and event_key combinations specified in the definition of the event monitor.

"Event_flag" is an array of number_of_events signed 4-byte binary variables in each element of which is returned an indication of the occurrence or non-occurrence of the event identified by the event_name and event_key pair specified by the corresponding elements of the event_name_address, event_name_length, event_key_address, and event_key_length arrays used in defining the event monitor, i.e.

TRACE TABLES

| | |
|---|---|
| 0, 1, 2, . . . | indicates that the event has been signaled, the number is the length of data provided on the signal that may be obtained with the EventRetrieve function. |
| −1 | indicates that the event has not been signaled, |
| −2 | indicates that the event definition has been deleted, and |
| −3 | indicates no corresponding event_name and event_key pair was defined in the event monitor. |

The event management services described above can be used to establish and process trace tables in the following manner when the events are trace events. As noted above, each event definition includes a loose signal limit which specifies a maximum number of event signals which can be stored, tied to the event definition in loose signal set 41 when there is no interested event monitor (which is selected-on). When the loose signal limit is reached, each subsequent event signal is stored at the expense of the oldest event signal; the newer event signals generally provide more important trace information. Therefore, the loose signal set can be used as a trace table, or a "pool" of event signals for a subsequently defined event monitor by delaying definition of an interested event monitor. When a process is interested in processing the trace event signals, the process defines an event monitor which is interested in the event and calls the EventWait function, EventTrap function or EventTest function. As a result of the creation of the event monitor, the loose signals for the event(s) of interest to the event monitor will be transferred to the bound signal set of the event monitor as described above with reference to FIG. 17. If there are enough of these signals to satisfy the event monitor, then the event monitor will establish the current signal set in response to the call to the EventWait function, EventTrap function, or EventTest function, and the event handler within the associated process can access the event signals within the current signal set.

Thus, the loose signal set of one or more event definitions can be accessed by interested event handlers according to their specific requirements by subsequently defining appropriate event monitors. Also, each event handler can access the trace table in real time, i.e., upon request, and can process the trace data directly from the current signal set (without having to access any external storage device such as a Direct Access Storage Device—DASD).

The transfer from the loose signal set to the bound signal set can be controlled in different ways using the foregoing functions. If an event monitor interested in all trace signals is created without first selecting the event off, all the loose signals within the loose signal set for that event will be transferred to the event monitor and then the loose signal set will be entirely depleted. As a result, if a second interested event monitor is subsequently defined, these loose signals will not be available to the second interested event monitor. However, if two or more event monitors need a copy of the loose signal set, then the following procedure can be utilized to provide the loose signals to all the event monitors. The event of interest is first selected-off by a call to the Event-Select function (step 254 of FIG. 14), which will then mark the event definition as "selected-off". Next, the event monitors are defined, and afterwards, the event is selected-on by another call to the EventSelect function (step 266 of FIG. 14). In response, the EventSelect function will mark the event definition as selected-on (step 268) and identify all event monitors which are interested in the event by reading the event monitor definitions (step 270). Next, the EventSelect function will transfer copies of all loose signals to all such interested event monitors if the broadcast mode has been designated in the event definition (and erase the loose signal set), or transfer all the loose signals to the first event monitor in the sequence if the propagation mode has been designated in the event definition (and erase the loose signal set) (step 272).

Also as noted above, each event monitor definition includes a bound signal limit and a satisfaction level for each event of interest to the event monitor. The bound signal limit for each event indicates the maximum number of event signals for the event that can be stored bound to the event monitor. When the next event signal for this event type is received, it is stored at the expense of the oldest event signal for the same type of event. The bound signal limits for different events of interest to the same event monitor can vary. The satisfaction level for each event indicates the number of occurrences of the event required to permit the event monitor to provide the associated event handler with the event signals from the current signal set. The satisfaction levels for different events of interest to the same event monitor can vary. Only when the satisfaction levels are met for all events is the event handler permitted to access the current signal set. Any number of event monitors can be defined, and the definitions can reference the same, different or partially overlapping sets of event types. One event or set of events can be of interest to multiple event monitors. Each application program can specify its own parameters for its event monitor or monitors, i.e. event types of interest, bound limits, and satisfaction levels. Also, each application program can control its own trace table with calls to the EventDelete function 69, EventEnable function 44, EventModify function 71, EventMonitorDelete function 68, EventMonitorEnable 64, and EventMonitorSelect function 66. Such control, as well as the creation of the event monitor, can be made at any time, i.e. dynamically.

Therefore, as an alternative to utilizing the loose signal set as a trace table or a pool for a subsequently defined event monitor, the event monitors can be defined before occurrences of the event(s) of interest, and used directly to provide the trace table. The bound limits establish the "wrap sizes" and the satisfaction levels establish the number of signals of each type to be made available to the event handler upon request. In this configuration, if the event handler calls the EventTrap or EventWait function before the event monitor is satisfied, then the event handler can access the trace table (current signal set) in real time, i.e. as soon as the event monitor satisfied. Also, when the current signal set is established and the event handler accesses the current signal set, the current signal set is erased to make room for new event signals in the bound signal set. While this alternate arrangement provide some advantages over the use of the loose signal set as a trace table or pool, the alternate arrangement may require a somewhat higher operating system overhead when multiple event monitors are interested in the same event because all event signals in the alternate arrangement are transferred to the bound signal set of all event monitors, even those in excess of the loose signal limit. In contrast, in the other arrangement which utilizes the loose signal set as a trace table or pool, the maximum number of event signals that require the overhead of subsequent transfer to an event monitor is the loose signal limit.

To facilitate and ensure proper establishment, management, and use of the trace tables, the following additional trace management services including an application program interface are provided. The trace management services are controlled by ITRACE and ETRACE keyboard commands, or a TRACECONTROL call. The TRACECONTROL call defines which trace events of a predetermined set should be signalled and the attributes of the signalled trace events, as well as provide some additional trace processing options. The TRACECONTROL call is made to a conversational monitor system (CMS) portion of operating system 11. Many of the standard functions of the conversational monitor system portion of operating system 11 are described in a publication entitled VM/ESA CMS Application Development Reference, published June 1990 by IBM Corp. of Armonk, N.Y. IBM order number SC24-5451-00. The format for the TRACECONTROL call is as follows:

| TRACECONTROL | Rtncode |
| --- | --- |
| | Rsncode |
| | Traceflg |
| | Wrapsize |
| | Function |
| | N |
| | Tracetype(N) |
| | Tracetype_Setting(N) |

Parameters:

"Rtncode" is a signed 4-byte binary variable to hold the return code from TRACECONTROL.

"Rsncode" is a signed 4-byte binary variable to hold the reason code from TRACECONTROL.

"Traceflg" specifies to what degree the signaller of a trace event is to be synchronized. It is a signed four byte binary integer with valid values as follows:

| 0 | (ASYNC) | signalling thread continues processing independently of event processing. |
| --- | --- | --- |
| 1 | (TSYNC) | signalling thread is suspended to await outcome of event processing. |
| 2 | (PSYNC) | signalling process is suspended to await outcome of event processing. |
| 3 | (DSYNC) | signalling process and all its descendants are suspended to await the outcome of event processing. |
| −1 | (UNCH) | synchronization is unchanged. |

"Wrapsize" specifies how many trace events are retained if no eligible trace event monitor exists at the time the event is signalled. This corresponds to the loose signal limit. When the wrapsize is exceeded, the oldest trace event is discarded to make room for the newest arrival. This is a four byte signed binary integer. A value of 0 indicates that no trace events are to be retained. A value of −1 indicates that trace events will continue to be retained until virtual storage is exhausted. A value of −2 indicates the wrapsize is to remain unchanged. Any other negative value is invalid.

"Function" specifies the use of the arrays to follow. It is a four byte signed binary integer with valid values as follows:

| 0 | (QUERY ITRACE) | The ITRACE tracetypes are queried and their setting is returned in the tracetype_settings array. |
| --- | --- | --- |

| | | |
|---|---|---|
| 1 | (QUERY ETRACE) | The ETRACE tracetypes are queried and their setting is returned in the tracetype_settings array. |
| 2 | (ITRACE) | The tracetypes and tracetype_settings are used as a callable interface to the ITRACE command. |
| 3 | (ETRACE) | The tracetypes and tracetype_settings are used as a callable interface to the ETRACE command. |
| −1 | (UNCH) | Indicates that the follows arrays are to be ignored. |

"N" Specifies the number of trace types to be set. It is a four byte signed binary integer.

"Tracetype" Specifies the trace types to be set. It is an array of 4-byte signed binary integers with the following valid values:

| | | |
|---|---|---|
| 0 | (ALL) | All trace types |
| 1 | (COMM) | Communication events |
| 2 | (DISP) | Dispatch events |
| 3 | (STOR) | Storage Management events |
| 4 | (IO) | I/O events |
| 5 | (PRGMAN) | Program Management events |
| 6 | (PRCMAN) | Process Management events |
| 7 | (MISC) | Timer, external interrupt and machine check events |
| 8 | (DTMAN) | Data Management events |
| 9 | (GROUP) | Previous settings are for all machines in the virtual machine group. |

"Tracetype_Setting" Specifies the settings corresponding to the trace type array. It is an array of 4-byte signed binary integers with the following valid values:

| | | |
|---|---|---|
| 0 | (OFF) | Corresponding trace type is set OFF. |
| 1 | (ON) | Corresponding trace type is set ON. |

The TRACECONTROL call always results in an event definition of session scope and broadcast signals. If the signalling thread does not continue independently of the event processing, the suspended thread will wait indefinitely, i.e. there is no timeout period. The tracetype and tracetype_setting arrays are processed in array order. For example, if values corresponding to ALL and OFF are the first elements in the respective arrays, all trace categories are set off before processing subsequent elements in the arrays. As a result, in general, an array element may be nullified by a subsequent array element. CMS will invoke the TRACECONTROL routine with the following parameter settings as part of its initialization—Function=ITRACE, Traceflg=ASYNC, Wrapsize=determined from DMSNGP, N=1, Tracetype=ALL, and Tracetype_Setting=ON. These settings are set before the system profile is executed and thus may be overridden by the system profile.

The ITRACE keyboard command is similar in effect to the TRACECONTROL API call, and specifies which of the predefined, trace events are selected for signalling by CMS to the event signal manager, and the "wrap size" or the loose signal limit. The format is as follows:

| | | |
|---|---|---|
| ITRACE | | |
| ALL | | ON/OFF |
| COMMUNICATION | | ON/OFF |
| DISPATCH | | ON/OFF |
| STORAGE | | ON/OFF |
| I/O | | ON/OFF |
| PROGMAN | | ON/OFF |
| PROCMAN | | ON/OFF |
| DATAMAN | | ON/OFF |
| MISC | | ON/OFF |
| GROUP | | ON/OFF |
| END | | |
| WRAPSIZE | | XXXXXXXX |

"All" specifies whether or not all trace entries will be signalled. Permissible values are:

| | |
|---|---|
| ON | trace entries are signalled. |
| OFF | trace entries are not signalled. |

"Communication" specifies whether or not communication trace entries will be signalled. Possible examples of this type of trace entry are IUCV and APPC transactions and queue operations. Permissible values are:

| | |
|---|---|
| ON | trace entries are signalled. |
| OFF | trace entries are not signalled. |

"Dispatch" specifies whether or not dispatch trace entries will be signalled. Possible examples of this type of trace entry are Thread Dispatch and Thread Priority Modification. Permissible values are:

| | |
|---|---|
| ON | trace entries are signalled. |
| OFF | trace entries are not signalled. |

"Storage" specifies whether or not storage trace entries will be signalled. Possible examples of this type of trace entry are Free Storage Obtain and Free Storage Return. Permissible values are:

| | |
|---|---|
| ON | trace entries are signalled. |
| OFF | trace entries are not signalled. |

"I/O" specifies whether or not I/O trace entries will be signalled. Possible examples of this type of trace entry are requests for I/O and I/O interrupt occurrences. Permissible values are:

| | |
|---|---|
| ON | trace entries are signalled. |
| OFF | trace entries are not signalled. |

"Progman" specifies whether or not program management trace entries will be signalled. Possible examples of this type of trace entry are Command Load and Program Load. Permissible values are:

| | |
|---|---|
| ON | trace entries are signalled. |
| OFF | trace entries are not signalled. |

"Procman" specifies whether or not process management trace entries will be signalled. Possible examples of this type of trace entry are Process Create and Thread Create. Permissible values are:

| | |
|---|---|
| ON | trace entries are signalled. |
| OFF | trace entries are not signalled. |

"Dataman" specifies whether or not data management trace entries will be signalled. Possible examples of this type of trace entry are File System Read and File System Write. Permissible values are:

| | |
|---|---|
| ON | trace entries are signalled. |
| OFF | trace entries are not signalled. |

"Misc" specifies whether or not trace entries not lending themselves to categorization will be signalled. Possible examples of this type of trace entry are machine checks, external interrupts and timer interrupts. Permissible values are:

| | |
|---|---|
| ON | trace entries are signalled. |
| OFF | trace entries are not signalled. |

"Group" specifies whether or not trace entries to be signalled are signalled in all machines in the issuer's virtual machine group. This operand applies only to those trace entries currently being signalled when the GROUP operand is processed. That is, operands to the right of the GROUP operand are not affected by the GROUP operand. This operand may not be specified by virtual machines which are not part of a group. Permissible values are:

| | |
|---|---|
| ON | trace entries are signalled in all machines in the virtual machine group. |
| OFF | trace entries are not signalled in any other machine in the virtual machine group. |

"End" specifies that no trace entries are to be signalled.

"Wrapsize xxx" specifies how many trace entries are retained in the trace table if no eligible trace event monitor exists at the time the trace entry is signalled. When the wrapsize is exceeded, the oldest trace entry is discarded to make room for the newest arrival. A value of 0 indicates that no trace entries are to be retained.

The ETRACE command specifies which of the selected trace events should be sent to a predetermined event handler within a control program of the operating system 11 for the purpose of recording the event signals in a spool file. The control program provides many standard functions as described in a publication entitled VM/ESA Diagnostics Guide for 370, published by IBM Corp of Armonk N.Y. in June 1990, IBM order number LY24-5242-00. The format for the ETRACE command is as follows:

ETRACE EVENTNAME ON OR OFF, EVENTNAME ON OR OFF ETC.

The steps involved in utilizing the trace management services are as follows:

First, an application program issues the TRACECONTROL call or a user enters the ITRACE command through the keyboard to define which trace events will be built and signalled, as well as the wrap size. Next, the trace events occur at appropriate points in the processing of CMS, and CMS, which serves as a signaller, signals the trace events including the event data. The format for the trace entries is as follows:

1. HEADER LENGTH—Length of the trace header information.
2. USERID—Userid of the virtual machine issuing the trace signal.
3. PROCESSID—Unique process identifier of the process on whose behalf this trace entry is being signalled.
4. THREADID—Unique thread identifier of the thread on whose behalf this trace entry is being signalled.
5. TRACEID—The specific type of trace entry.
6. TIMESTAMP—Time at which the trace entry is being signalled (in timer units).
7. FORMAT ROUTINE—Identifier of routine that is needed to format this trace entry.
8. VARIABLE HEADER DATA—Other data which may be included in the header.
9. DATA LENGTH—Length of actual trace data.
10. VARIABLE DATA—Actual trace data.

As long as no event monitors are interested in the trace events, the maximum number of trace event signals which are stored is equal to the wrap size, and these trace events are stored in the loose signal set. Next, a user application program calls the EventMonitorCreate function to establish an event monitor which is interested in the event. The EventMonitorCreate call can include specification of a limiting key to limit the interest of the event monitor. In this scenario, only the first event monitor which is established having interest in the event will receive the content of the loose signal set. Alternately, as noted above, the event can be selected off before two or more event monitors are created to provide copies of the loose signal set to the two or more event monitors. Next, the user application program calls the EventWait or EventTrap function to obtain the current signal set when the event monitor is satisfied. The user application program is notified upon satisfaction of the event monitor and can call the EventRetrieve function to read the contents of the current signal set and then process the event data.

It should be understood that even though the foregoing trace management services and application program interface refer to a virtual machine environment, they are useful in other environments.

Figure 18:
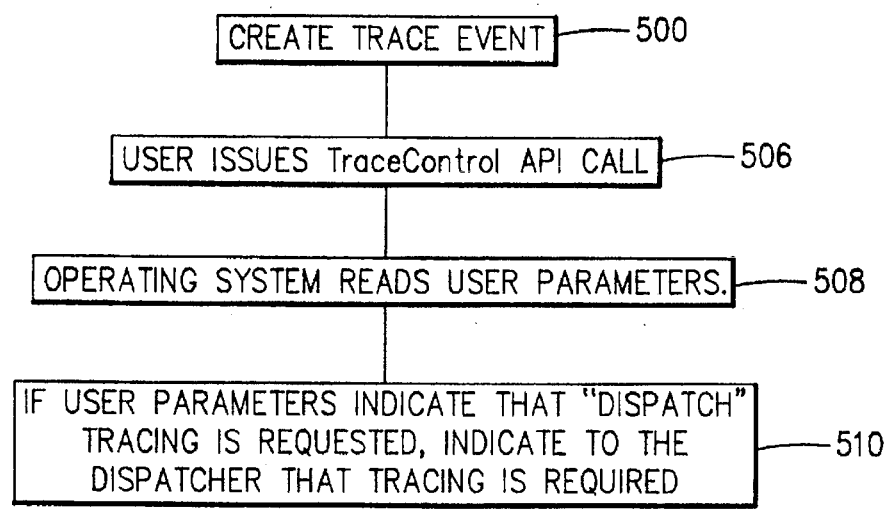
FIG. 18 and FIG. 19 are flowcharts illustrating the trace management services of the operating system of FIG. 1.
Figure 19:
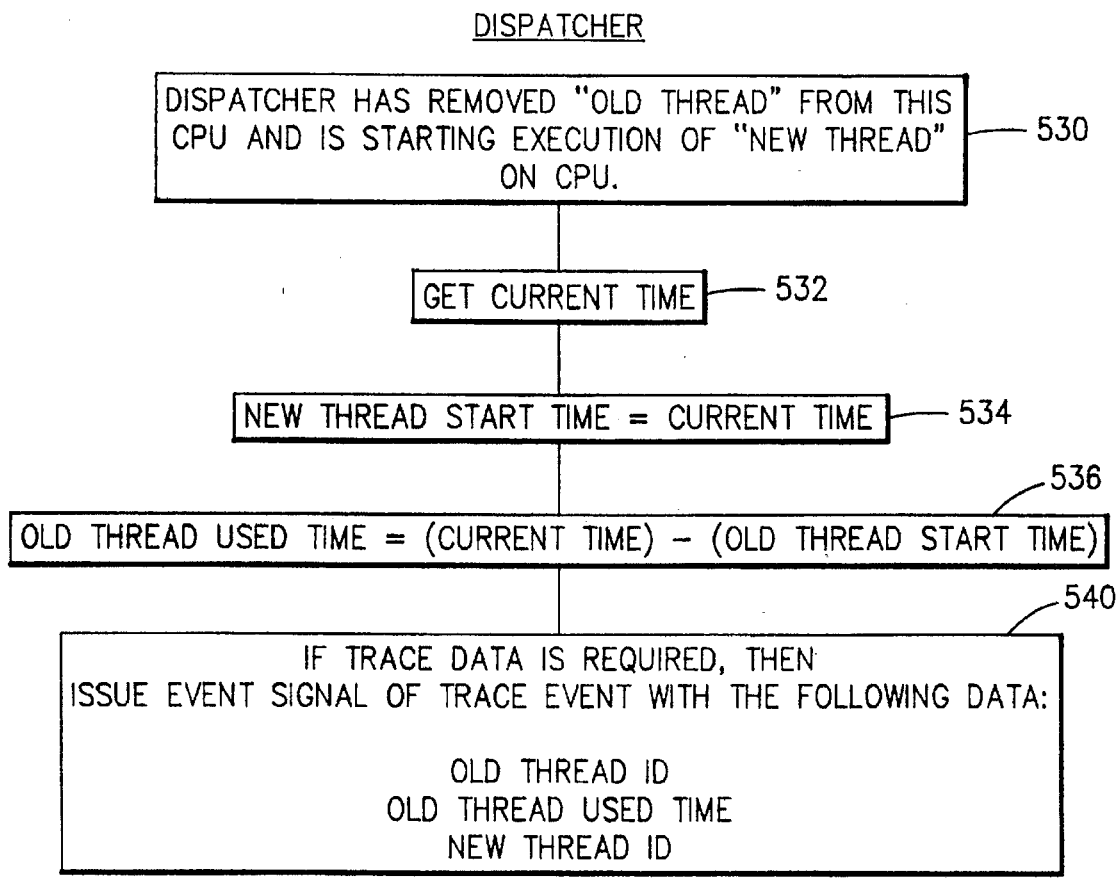

FIGS. 18 and 19 are flowcharts illustrating an example of usage of the trace management services and application program interface to trace (for trouble shooting purposes) which program threads in a multitasking operating system have been executed (for trouble shooting purposes) and the time of execution for each thread. FIG. 18 illustrates the actual trace management services and API which are involved in this function. In step 500, the operating system creates an event named "Trace" by a call to the EventCreate function 40. Next, the user application program issues a TRACECONTROL call and specifies a Dispatch type of event as a parameter in the call (step 506). The operating system reads the Dispatch parameter from the call (step 508), and then notifies the dispatcher to signal the Dispatch event (step 510). The dispatcher is the function that selects program threads for execution by CPU 19.

FIG. 19 is the flowchart for the dispatcher referenced in FIG. 18. In step 530, the dispatcher removes an old thread from the CPU and starts execution of a new thread. To provide event data to accompany the trace event signal, the dispatcher reads the current time (with a clock not shown) (step 532), and stores this current time as being the time that the new thread started and the old thread halted execution (step 534). The dispatcher then computes the old thread's CPU execution time as the difference between the current time and the start time for the old thread which was previously stored (step 536). Next, the dispatcher calls the EventSignal function and provides the following event data: old thread ID, old thread CPU usage time, and new thread ID (step 540).

We claim:

1. A computer system comprising:

means for receiving and storing definitions of different types of events, each of said definitions specifying a mode of operating a signaller of the event while the event is being handled, the operating modes including a synchronous mode in which the event signaller suspends processing until the event is handled, and an asynchronous mode in which the event signaller continues processing while the event is handled; and event manager means, coupled to the event signallers and storing means, for receiving event signals for the events, and advising the event signaller of each event whether to proceed synchronously or asynchronously according to the corresponding event definition.

2. A computer system as set forth in claim 1 further comprising:

means, coupled to said event manager means, for receiving notification from an event handler which resides within an application program executing within the computer system and which received notification of the event and is handling or has handled said event, whether the event signaller can continue with other processing; and wherein said event manager means advises said event signaller whether to continue other processing based on said notification from said event handler if processing of said event signaller or associated process has been suspended.

3. A computer system as set forth in claim 1 further comprising means for storing event signals in association with the corresponding event definition; and wherein said event manager means controls the storage of event signals in the storing means before any application program requests notification of the event.

4. A computer system as set forth in claim 3 wherein each of said event definitions includes a limit which indicates a maximum number of event signals which can be stored in the storage means in association with the corresponding event definition before any application program requests notification of the event; and said event signals are stored in accordance with said limit.

5. A computer system as set forth in claim 4 wherein said event manager means stores a new event signal and erases the oldest stored event signal when the maximum number of event signals have already been stored in accordance with the event definition before the occurrence of the new event.

6. A computer system as set forth in claim 1 further comprising first and second event monitor means, coupled to said event manager means, for receiving signals of events in which the respective event monitors are interested, each of said event monitor means being defined by a program and notifying the program of the events after receiving the signals of the events.

7. A computer system as set forth in claim 1 wherein the event manager means includes means, responsive to an application program which is interested in an event, for modifying the corresponding event definition at various times throughout execution of said application program.

8. A computer system as set forth in claim 1 further comprising:

means, coupled to said event manager means, for receiving notification from an application program executing within the computer system and which received notification of the event that the application program has handled the event; and wherein said event manager means advises said event signaller based on said notification from said application program.

9. A computer system as set forth in claim 1 wherein the receiving means includes means for receiving said definitions from programs throughout operation of said event manager means.

10. A computer system as set forth in claim 1 wherein said event manager means includes means for receiving from a program a request to delete one of said definitions after one or more of the defined events have occurred such that the subsequent occurrences of the event are not stored and do not cause said event manager means to advise the event signaller whether to suspend or continue processing.

11. A computer system as set forth in claim 10 further comprising event definition deleting means, responsive to said request to delete said event definition, for directly or indirectly notifying an application program which has requested notification of said event that the event definition has been deleted.

12. A computer system as set forth in claim 1 further comprising means, coupled to said event manager means, for dynamically establishing an event handler which receives notification of said event.

13. A computer system as set forth in claim 12 wherein one of said events is a call to an exit routine and said event handler provides said exit routine.

14. A method for managing an event in a computer system, said method comprising the steps of:

receiving and storing a definition of an event, said definition specifying a mode of operating a signaller of the event while the event is being handled, the operating modes including a synchronous mode in which the event signaller suspends processing until the event is handled, and an asynchronous mode in which the event signaller continues processing while the event is handled;

receiving a signal of the event; and advising the event signaller of the event whether to proceed synchronously or asynchronously according to the respective event definition.

15. A method as set forth in claim 14 further comprising the steps of:

receiving notification from an event handler which resides within an application program executing within the computer system and which received notification of the event, whether the event signaller can continue with other processing; and advising said event signaller whether to continue other processing based on said notification from said event handler if said event signaller is suspended.

16. A method as set forth in claim 14 further comprising the step of storing signals of occurrences of said event in association with the corresponding event definition before any application program requests notification of the event.

17. A method as set forth in claim 16 wherein said event definition includes a limit which indicates a maximum number of event signals which can be stored in the storage means in association with the event definition before any application program requests notification of the event; and said event signals are stored in accordance with said limit.

18. A computer system comprising:

means for receiving and storing definitions of different types of events, each of said definitions specifying a mode of operating a signaller of the event while the event is being handled, the operating modes including a synchronous mode in which the event signaller suspends processing until the event is handled, and an asynchronous mode in which the event signaller continues processing while the event is handled; and event manager means, coupled to the event signallers and storing means, for receiving event signals for the events, and advising the event signaller of each event whether to proceed synchronously or asynchronously according to the corresponding event definition; and wherein the receiving means includes means for receiving, from a program, changes to the specified mode of operating the signaller in the event definition after one or more of said events have occurred and the event manager means has advised the corresponding event signaller in accordance with the original definition, and dynamically updating the event definition according to the changed definition such that for subsequent occurrences of the event, the event manager means advises said event signaller in accordance with the changed definition.

19. A method for managing an event in a computer system, said method comprising the steps of:

receiving and storing a definition of an event, said definition specifying mode of operating a signaller of the event while the event is being handled, the operating modes including a synchronous mode in which the event signaller suspends processing until the event is handled, and an asynchronous mode in which the event signaller continues processing while the event is handled;

receiving a signal of the event;

advising the event signaller of the event whether to proceed synchronously or asynchronously according to the respective event definition; and after the steps of receiving the event signal and advising the event signaller, changing the specification in the event definition for the mode of operating the signaller of the event while the event is being handled.

20. A method as set forth in claim 19 further comprising the steps of:

receiving notification from an application program executing within the computer system and which received notification of the event that the application program has handled the event; and advising said event signaller based on said notification from said application program and the changed definition of the event.

* * * * *